（12） United States Patent
Butler

(10) Patent No.: US 6,274,869 B1
(45) Date of Patent: Aug. 14, 2001

(54) DIGITAL OFFSET CORRECTOR

(75) Inventor: Neal R. Butler, Acton, MA (US)

(73) Assignee: Lockheed-Martin IR Imaging Systems, Inc., Lexington, MA (US)

( * ) Notice: Subject to any disclaimer, the term of this patent is extended or adjusted under 35 U.S.C. 154(b) by 0 days.

(21) Appl. No.: 08/981,109

(22) PCT Filed: Jun. 28, 1996

(86) PCT No.: PCT/US96/11014

§ 371 Date: May 26, 1998

§ 102(e) Date: May 26, 1998

(87) PCT Pub. No.: WO97/01926

PCT Pub. Date: Jan. 16, 1997

(51) Int. Cl.[7] .................................................. G01J 5/30
(52) U.S. Cl. .................... 250/338.1; 250/332; 250/252.1
(58) Field of Search ............................ 250/338.1, 338.3, 250/378.4, 332, 252.1

(56) References Cited

U.S. PATENT DOCUMENTS

| 3,665,190 | 5/1972 | Kotera et al. . |
| 3,801,949 | * 4/1974 | Larrabee ............................. 338/22 R |
| 3,891,843 | 6/1975 | Parkin . |
| 3,971,015 | 7/1976 | Hornak . |
| 3,973,146 | 8/1976 | Arnold et al. . |
| 4,276,474 | 6/1981 | Crawford . |
| 4,298,887 | 11/1981 | Rode . |
| 4,369,463 | 1/1983 | Anastassiou et al. . |
| 4,513,390 | 4/1985 | Walter et al. . |
| 4,587,426 | 5/1986 | Munier et al. . |

(List continued on next page.)

FOREIGN PATENT DOCUMENTS

| 0 534 769 | 3/1993 | (EP) . |
| 2 554 999 | 5/1985 | (FR) . |
| 2 202 702 | 9/1988 | (GB) . |
| WO93/18492 | 9/1993 | (WO) . |
| WO 94/00950 | 1/1994 | (WO) . |

OTHER PUBLICATIONS

N. Butler et al., "Dual Use, Low Cost Uncooled Microbolometer Imaging System," Jul. 12, 1995, Presented at SPIE, San Diego, CA.
N. Butler et al., "Advanced Microbolometer Digital Output Focal Plane Array," Jul. 1996.
C. Marshall et al., "Uncooled Microbolometer Imaging Sensors".
"Patent Scout Uncooled IR Detectors," Jul. 30, 1996.
W.T. Holman, "A Compact Low Noise Operational Amplifier for a 1.2 μm Digital CMOS Technology," Jun. 30, 1995, pp. 710–714, IEEE Journal of Solid–State Circuits, vol. 30 No. 6.

(List continued on next page.)

Primary Examiner—Constantine Hannaher
Assistant Examiner—Albert Gagliardi
(74) Attorney, Agent, or Firm—Wolf, Greenfield & Sacks, P.C.

(57) ABSTRACT

An offset corrector for a focal plane array. A bolometer array configured in a row and column readout format has dedicated column circuits to measure the resistance of each bolometer in the column. A high speed on-chip analog to digital converter converts the analog sensor signal to a digital representation. Since the response of each bolometer varies, an offset controller, connected to the output of the analog to digital converter, corrects the digital representation for variations in individual bolometer response. Each pixel has a corresponding dynamically computed offset stored in the memory. The offset is computed when a chopper or shutter blocks radiation from the focal plane array. The focal plane array is temperature stabilized to a predetermined temperature to keep bolometer response within a predetermined bandwidth.

19 Claims, 29 Drawing Sheets

U.S. PATENT DOCUMENTS

| | | |
|---|---|---|
| 4,609,824 | 9/1986 | Munier et al. . |
| 4,652,766 | 3/1987 | Wang et al. . |
| 4,654,622 | 3/1987 | Foss et al. . |
| 4,659,928 | 4/1987 | Tew . |
| 4,679,068 | 7/1987 | Lillquist et al. . |
| 4,684,812 | 8/1987 | Tew et al. . |
| 4,686,373 | 8/1987 | Tew et al. . |
| 4,745,278 | 5/1988 | Hanson . |
| 4,752,694 | 6/1988 | Hegel, Jr. et al. . |
| 4,754,139 | 6/1988 | Ennulat et al. . |
| 4,792,681 | 12/1988 | Hanson . |
| 4,831,257 | 5/1989 | McClelland et al. . |
| 4,902,895 | 2/1990 | Hanson . |
| 4,935,629 | 6/1990 | Livermore et al. . |
| 4,967,082 | 10/1990 | Cooke et al. . |
| 4,991,109 | 2/1991 | Crookshanks . |
| 4,991,127 | 2/1991 | Crookshanks . |
| 5,010,251 | 4/1991 | Grinberg et al. . |
| 5,021,663 | 6/1991 | Hornbeck . |
| 5,084,704 | 1/1992 | Parrish . |
| 5,129,595 | 7/1992 | Thiede et al. . |
| 5,134,474 | 7/1992 | Hanafusa et al. . |
| 5,175,802 | 12/1992 | Crookshanks . |
| 5,185,883 | 2/1993 | Ianni et al. . |
| 5,200,623 | 4/1993 | Cannata . |
| 5,201,582 | 4/1993 | Lesniak . |
| 5,204,761 | 4/1993 | Gusmano . |
| 5,268,576 | 12/1993 | Dudley . |
| 5,288,649 | 2/1994 | Keenan . |
| 5,389,788 | 2/1995 | Grinberg et al. . |
| 5,399,889 | 3/1995 | Miyake et al. . |
| 5,420,419 | 5/1995 | Wood . |
| 5,442,176 | 8/1995 | Eckel, Jr. et al. . |
| 5,446,284 | 8/1995 | Butler et al. . |
| 5,486,698 | 1/1996 | Hanson et al. . |
| 5,489,776 | 2/1996 | Lung . |
| 5,532,484 | 7/1996 | Sweetser et al. . |
| 5,591,973 | 1/1997 | Masarik et al. . |
| 5,650,622 | 7/1997 | Ookawa et al. . |
| 5,756,999 | 5/1998 | Parrish . |

OTHER PUBLICATIONS

International Search Report issued in International Patent Application PCT/US96/13853 Filed Aug. 30, 1986.

International Search Report from PCT application no. PCT/US96/11014.

Co–pending U.S. Patent Application, Serial No. 08/973,058, filed May 26, 1998, Neal R. Butler, "Monolithic Analog–to–Digital Converter", Attorney Docket No.: L0501/7020.

Co–pending U.S. Patent Application, Serial No. 09/011,942, filed Aug. 24, 1998, Neal R. Butler "Bolometric Focal Plane Array", Attorney Docket No.: L0501/7022.

Co–pending U.S. Patent Application, Serial No. 09/051,180, filed Sep. 14, 1998, Neal R. Butler "Uncooled Focal Plane Array Sensor", Attorney Docket No.: L0501/7023.

\* cited by examiner

DIGITAL OFFSET CORRECTOR

Background of the Invention

1. Field of the Invention

The invention relates to focal plane array signal processing. and, more particularly, to a digital offset correcting signal processor for a microbolometer focal plane array.

2. Discussion of the Related Art

A focal plane array that uses an array of radiation sensors typically suffers from variations in sensor element output from sensor to sensor. This variation comprises two basic components, an offset uniformity error and a gain uniformity error. Offset uniformity error may be measured by blocking external radiation from the radiation sensing elements of the array and measuring the variations in output from each sensor element. Gain uniformity error may be measured by presenting a uniform radiant field to the focal plane array and noting the variations in sensor element output.

Until the present invention, focal plane array offset correction has been limited to analog circuits that attempt to subtract a real time or stored analog signal from a detected signal. Such approaches provide poor offset compensation in relation to the accuracy of the apparatus and method of the present invention for providing offset correction.

One such type of radiation sensor is a bolometer. A bolometer absorbs infrared radiation. A bolometer has a large temperature coefficient of resistance and, as a result, absorbed radiation changes the temperature of the bolometer and, therefore, the bolometer's resistance. Bolometer imaging systems are sensitive to long wave infrared, typically in a wavelength range of 8–12 micrometers. Such infrared systems form images from variations in the amount of radiation emitted from objects within a field of view.

SUMMARY OF THE INVENTION

Variations in the outputs of bolometer detector elements may be translated to a nonuniformity in linear slope response from sensor element to sensor element. A gain factor may then be calculated for each element from the linear slope response. The output of each element may first be offset, and then gain corrected to produce a uniform response, The invention provides a method and apparatus for setting the offset of output signals for an array of bolometers. A pixel-by-pixel offset compensator of the invention is disclosed for a microbolometer focal plane array including a plurality of detector elements. Each one of the plurality of detector elements has a detector output. The apparatus of the invention includes apparatus for providing a separate offset for each detector in the array where the separate offset may be derived from information from an external source. The apparatus further comprises a means for time sharing connected to the providing means, where the means for time sharing cooperates with the providing means to provide different offsets for different elements in the array. In another aspect of the invention, the means for providing a separate offset further comprises a means for adjusting a current to the detector.

In yet another aspect of the invention, the means for providing a separate offset further comprises a means for adjusting a voltage at the detector.

In yet another aspect of the invention, the means for providing a separate offset further comprises a means for connecting a resistance to the detector.

In another aspect of the invention, a pixel-by-pixel offset compensator for a microbolometer focal plane array comprises an array of detector elements. Each one of the array of detector elements has a detector output. Means for providing a time-varying compensation bias for each detector in the array is connected to the array of elements to compensate for effects of change in detector resistance during a bias control signal.

In another aspect of the invention, the means for providing a time-varying compensation bias further comprises a means for compensating that changes the offset current for each element in the array.

In another aspect of the invention, the compensating means further comprises a means for generating a time-varying compensation waveform so as to force the average current to be constant during the bias control signal.

In another aspect of the invention, the means for providing a time-varying compensation bias further comprises a means for compensating by changing the detector bias voltage for each element in the array.

In another aspect of the invention, the compensating means further comprises a means for generating a time-varying compensation waveform so as to force the average current to be constant during the bias control signal.

In another aspect of the invention, a pixel-by-pixel offset compensator for a microbolometer focal plane array comprises a plurality of detector elements including at least one output carrying a signal. Means for generating a dynamic residue by dynamically offsetting the at least one output with an offset is connected at the output. Circuitry is coupled to the output for measuring the dynamic residue for each detector where the dynamic residue comprises the signal at the at least one output minus the offset.

In another aspect of the invention, the circuitry for measuring the dynamic residue further comprises means for integrating a current onto a capacitor, where the integrating means is connected to the at least one output, means for determining when the capacitor reaches a threshold value, means for resetting the capacitor when it reaches the threshold value, and means, connected to the capacitor, for measuring the number of times the capacitor voltage reaches the threshold value so as to measure the offset.

In another aspect of the invention, means for providing a separate preset for each of the plurality of detectors is connected to the capacitor wherein the separate preset is supplied from an external source.

In another aspect of the invention, the offset correction apparatus and the plurality of detector elements are constructed on an integrated circuit.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION

Figure 1:
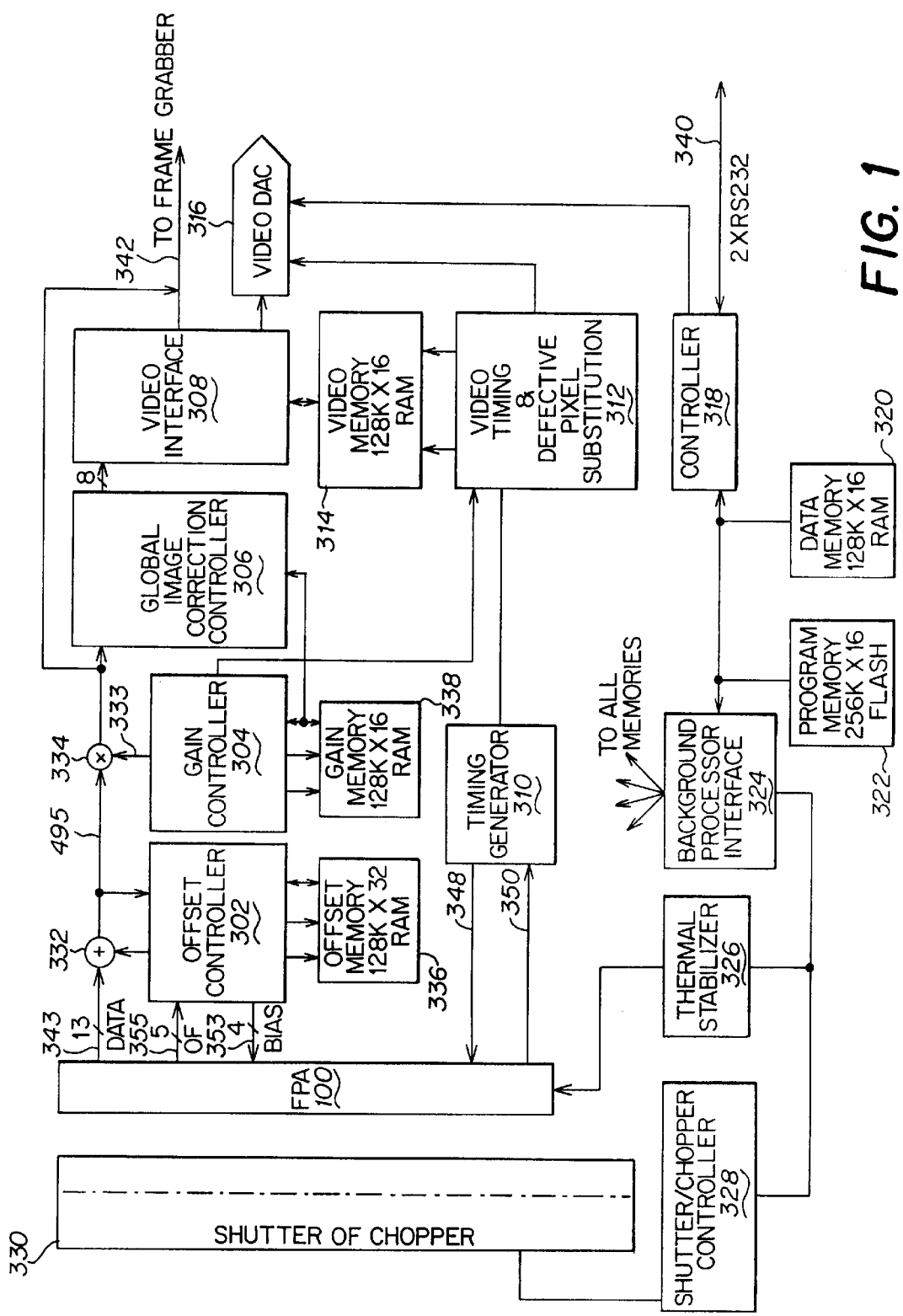
FIG. 1 shows a schematic block diagram of a digital offset correction apparatus as employed in one embodiment of the invention.

FIG. 1 shows a schematic block diagram of a digital offset correction apparatus as employed in one embodiment of the invention. The digital offset correction apparatus comprises a shutter/chopper controller 328 coupled to control shutter 330. It will be appreciated that, depending upon the particular application, a germanium or opaque chopper or other equivalent optical device may be substituted for the shutter 330. The shutter 330 controls radiant energy entering the system. When the shutter is open, radiant energy impinges upon focal plane array (FPA) 100. The chopper 330 may be synchronized with the FPA frame rate. FPA 100 may advantageously be comprised of an integrated microbolometer focal plane array with associated control electronics. The integrated microbolometer focal plane array may be further comprised of pixel elements wherein each pixel element provides a signal representative of an amount of radiant energy absorbed by the pixel element. The FPA 100 may be operated in a vidicon mode where the FPA 100 is not blocked by an obstruction. In the vidicon mode, images may be obtained continuously.

An offset signal on signal line 353 is provided by an offset controller 302. The offset controller 302 interfaces to an offset memory 336 with a 17-bit address line, a 2-bit control line and a 32-bit data line. In one example embodiment of the invention the offset memory may be a 128K by 32 RAM. A timing generator 310 provides two timing signals 348 and receives two clock signals 350 from the focal plane array 100. Timing generator 310 also provides timing signals to a video timing and defective pixel substitution controller 312. A gain controller 304 provides a gain adjust signal 333. Global image correction controller 306 provides an 8-bit signal to a video interface 308.

In one embodiment of the invention, summation node 332 adds the offset signal from the offset controller 302 to the output 343 of the focal plane array 100. A video generator 316 is provided with video timing and the output of a controller 318. The video generator 316 may advantageously comprise a digital-to-analog converter as is known in the art. The controller 318 may advantageously comprise a microprocessor, such as, for example, a commercially available model 80C186EC type microprocessor or equivalent. A background processor interface 324 is provided with a program memory 322 and a data memory 320. In one embodiment of the invention, the program memory 322 may comprise a 256K×16 flash memory and the data memory 320 may comprise a 128K×16 RAM. The controller 318 may advantageously be connected through the background processor interface 324 to write or read data from each memory including the gain memory 338, the offset memory 336, and the video memory 314. Serial communications line 340 may be coupled to provide an external interface for the controller 318. Video output data is available from the video DAC 316, frame data is available to an external frame grabber on line 342. Thermal stabilization of the FPA 100 may be provided by thermal stabilizer 326.

The controller 318 interfaces the imaging system to external systems through a host microcomputer. The controller 318 also generates histograms, generates brightness and equalization curves, controls the chopper or shutter, generates reference image frame timing, performs memory and system diagnostics, monitors manual controls and switches, and controls the TE stabilizer 326. Timing generator 310 generates the FPA 100 clocks, the system clocks, and required timing signals.

Figure 2:
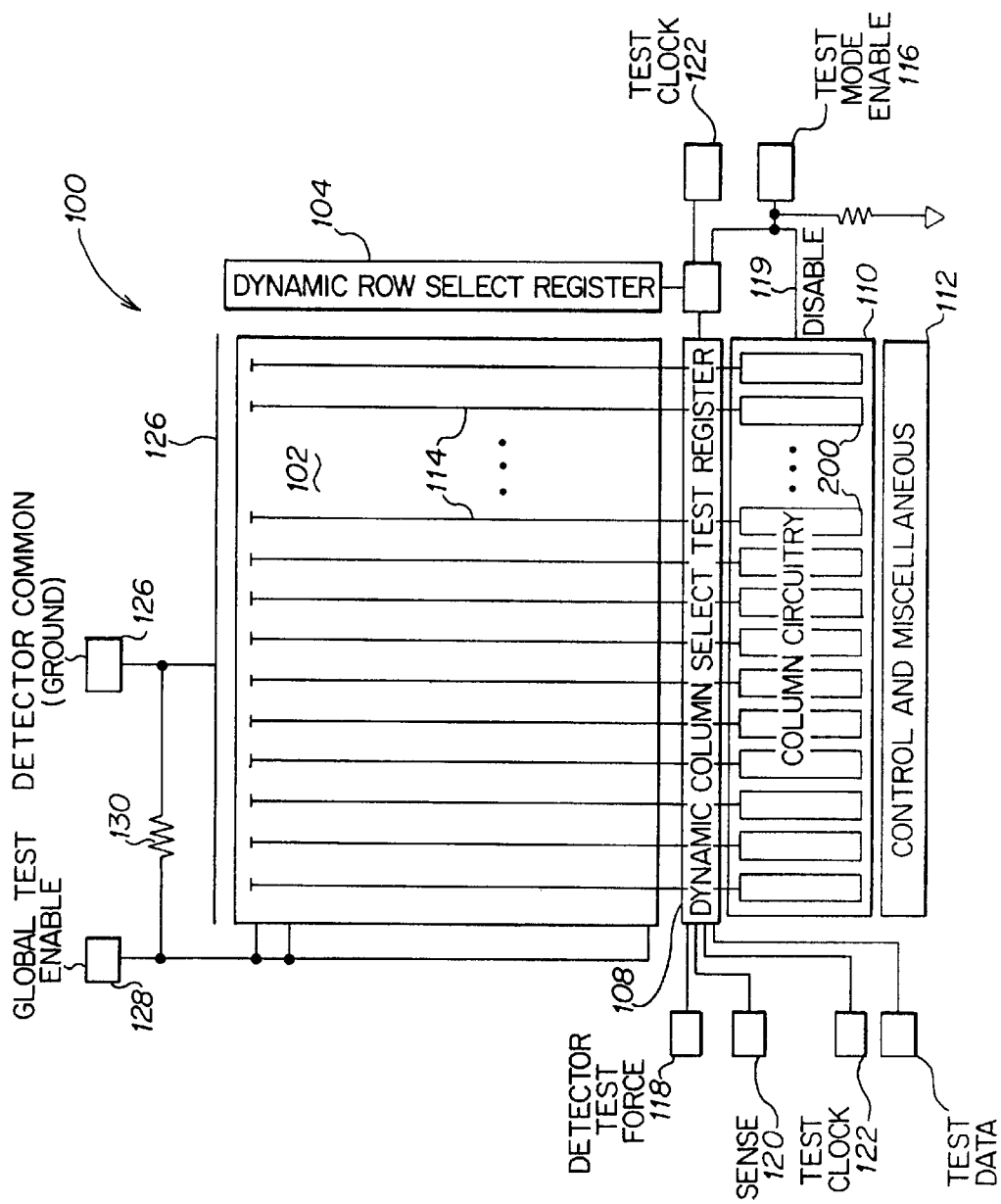
FIG. 2 shows a schematic diagram of a detector array of the invention.

FIG. 2 shows a schematic diagram of the array sensor of the invention. A microbolometer array 102 comprises the radiation sensing portion of the focal plane array 100. In one embodiment. the array 102 may comprise over 80,000 individual microbolometers. The electronic circuits associated with each microbolometer are shown in more detail in FIG. 3. A detector common 126 is distributed uniformly over the array 102. The array is arranged in a regular grid of microbolometers, by column line 114, addressed individually using a dynamic row select register 104 and column circuitry 110. The array 102 and the array's electronics may be tested during array production. The test clock 122, test data 124, test mode enable 116, global test enable 128 and detector test force 118 signals provide the control signals used to test the array. Column processing circuitry 200 is provided for each column line 114 in the array. The column processing circuitry 110 is shown in more detail in FIG. 5.

The array 102 has a distributed common 126 and a distributed global test enable 128. The array 102 is addressed using a dynamic row select register 104 and in a test mode a dynamic column select test register 108. In operation, column circuitry 200 addresses any particular column. Control 112 controls the operation of the column circuitry. The column circuitry can be disabled with disable line 119.

Figure 3:
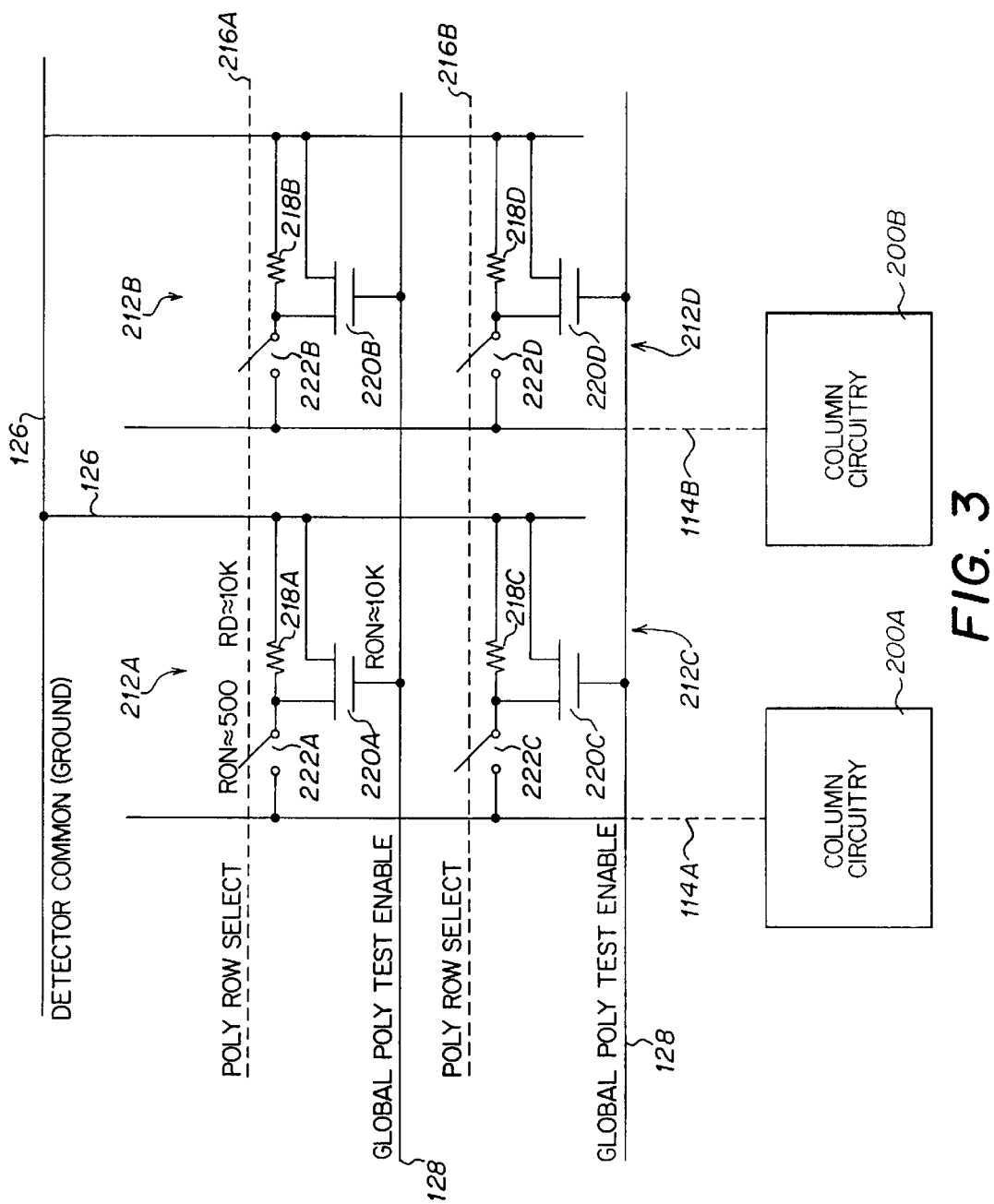
FIG. 3 is a circuit schematic diagram of one portion of a microbolometer array of the invention showing four example detectors and detector electronics.

FIG. 3 is a circuit schematic diagram of one portion of the microbolometer array of the invention showing an example of four detectors and associated detector electronics. The microbolometer array comprises a plurality of basic unit cells including multiplexer test transistors. In one embodiment the microbolometer focal plane array may comprise a 328×246 matrix of unit cells having 328 column circuits. The detector common 126 is connected to one side of bolometers 218A, 218B, 218C and 218D and unit cells 212A, 212B, 212C and 212D, respectively. The bolometers are connected in parallel with test transistors 220A, 220B, 220C and 220D. The "on" resistance of transistors 220A, 220B, 220C and 220D approximates that of the bolometers 218A, 218B, 218C and 218D. Thus, the test transistors can be used to provide a signal that emulates the bolometer signal. The emulated signal may be used to test the multiplexer circuitry before the bolometers are created. Such testing may result in less expensive manufacture because defective chips may be thus identified prior to final fabrication. Switches 222A, 222B, 222C and 222D switch the bolometer or test transistor signal in response to row select lines 216A and 216B. In a test mode the test transistors may be activated by the global test enable 128 and each individual row may be selected using one of the row select lines. An output is available at each column circuit 200A and 200B. In a test mode the column circuitry 200A and 200B is bypassed and addressed with a column multiplexer.

Figure 4:
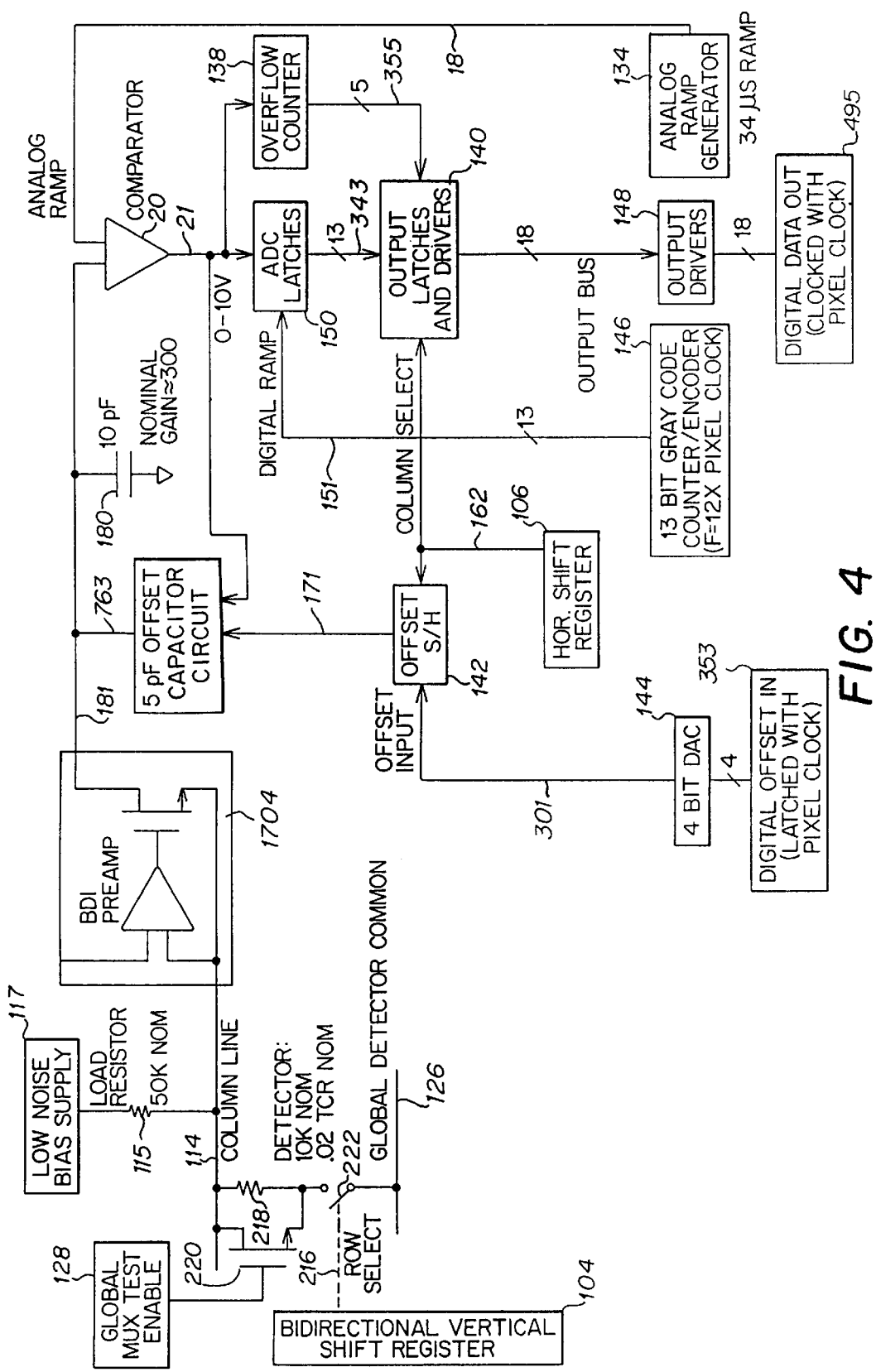
FIG. 4 shows a circuit schematic diagram of a microbolometer array compensation circuitry of the invention.

Refer now to FIG. 4 which shows one example of microbolometer array compensation circuitry of the invention. A bidirectional vertical shift register 104 functions as the row select for the array. Row select line 216 activates switch 222 to either select the signal from the bolometer 218 or the test transistor 220. A global test enable 128 activates all test transistors. The column line 114 is biased by a supply 117. The column line 114 is sensed by a buffered direct injection (BDI) circuit 1704 having a preamplifier stage and an output transistor stage. The integration capacitor 180 integrates the signal on the column sense line 181. In one embodiment of the invention the integration capacitor may have an integration time of about 29 microseconds. An offset capacitor circuit 16 provides an initial offset signal 763 in order for the integration capacitor 180 to provide a more precise sample of the bolometer 218 signal. In one embodiment, the offset capacitor of the circuit 16 may be about 5 pF, and the integration capacitor may be about 10 pF. Comparator compares the analog ramp 18 to the integrated signal on column sense line 181.

The ramp generator 134, shown in more detail below, provides the comparator with an analog ramp signal 18. The ramp signal, in one example, may be a 34 μs ramp that may nominally range between about 5 volts to 10 volts. The comparator 20 provides a binary signal 21 to three elements: the offset capacitor circuit 16, analog-to-digital latches 150 and an overflow counter 138. In this embodiment, the digital offset corrector of the invention has two analog-to-digital conversion phases. A first phase is the "coarse" conversion phase and a second phase is the accurate conversion phase or "fine" conversion phase. The two phases provide an integrated analog-to-digital conversion by taking advantage of the architecture of the column circuitry. During the coarse conversion phase the ramp signal is held to its low value, about 4 volts in one example. The circuitry integrates and dumps the integration capacitor 180 a number of times.

The number of times that the circuitry dumps the signal from the integration capacitor 180 depends upon the size of the integration capacitor and the background detector bias. The detector bias charge is usually much greater than the integration capacitor capability. As a result, the integration capacitor would be swamped by the bias signal. To avoid this, the capacitor integrates and resets a number of times. The capacitor 180 is reset to allow the bolometer signal to be integrated in a "fine" mode. The signal remaining on the capacitor will be representative of the voltage from the bolometer. The overflow counter 138 counts the number of times the capacitor is dumped. In the "fine" mode, a digital ramp signal 151 is provided from a 13 bit gray code counter encoder 146. The 13 bit gray code clock may operate using a frequency equal to 12 times the pixel clock, using four phases of the 12x_clock for 13 bit resolution. The digital ramp signal and the analog ramp signal are coordinated so that they start and end at the same time. Horizontal shift register 106 provides the offset sample and hold 142 with the proper column select signal 162 to set the offset capacitor 16. A digital offset 353 is provided to a four bit digital-to-analog converter 144 and the offset input sample and hold 142 receives the analog output 301 of the four bit digital-to-analog converter 144. The digital offset 353 may be advantageously latched with the pixel clock. The column select signal 162 provides the addressing for the offset sample and hold 142 and the output latches and drivers 140. Depending on the column selected, the output latches and drivers provide the count of the overflow counter 138 and the count of the analog-to-digital converter latches 150, enabled by comparator 20. The output drivers 148 provide digital data 495 to the off focal plane circuits. The digital data 495 is a concatenation of the overflow counter and the analog-to-digital converter latches and may be clocked with the pixel clock. The analog ramp and digital ramp are started at the start of the "fine" mode phase.

Figure 4A:
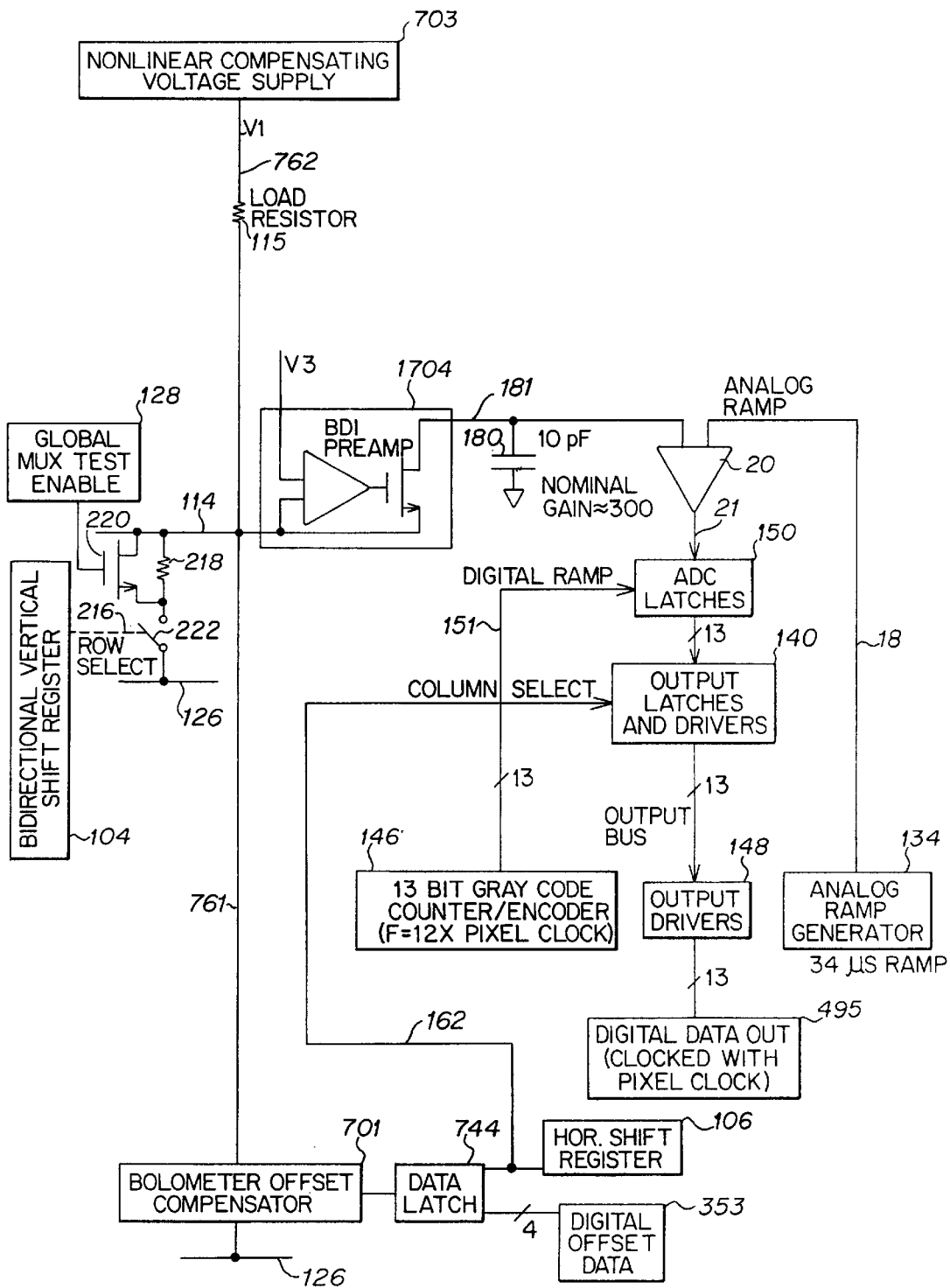
FIGS. 4A, 4B and 4C show alternate examples of microbolometer array compensation circuitry embodied, for example in an integrated circuit, of the invention employing a bolometer offset compensator.

Refer now to FIG. 4A which shows an alternate example of microbolometer array compensation circuitry of the invention employing a bolometer offset compensator 701 connected in parallel with the detector elements. The compensation circuitry may advantageously be integrated onto a single integrated circuit with the focal plane array using, for example, MOS technology. It will be understood that the bolometer offset compensator and its control circuits are replicated for each column of detectors in the array. The alternate embodiment shown in FIG. 4A optionally includes a nonlinear compensating voltage supply 703 coupled to load resistor 115. The load resistor 115 is connected to the bolometer offset compensator 701 and the column line 114. One embodiment of the bolometer offset compensator 701 is described in more detail below with reference to FIG. 15. The bolometer offset compensator 701 is coupled at a first terminal to load resistor 115 and at a control input to data latch 744. The data latch 744 is described in more detail below with reference to FIG. 16. Digital offset data 353 is provided to the data latch 744. The digital offset data represents the offset signal 761 to be applied to each row and column bolometer signal on column line 114. A BDI preamplifier 1704 amplifies the offset bolometer signal for further processing.

Figure 4B:
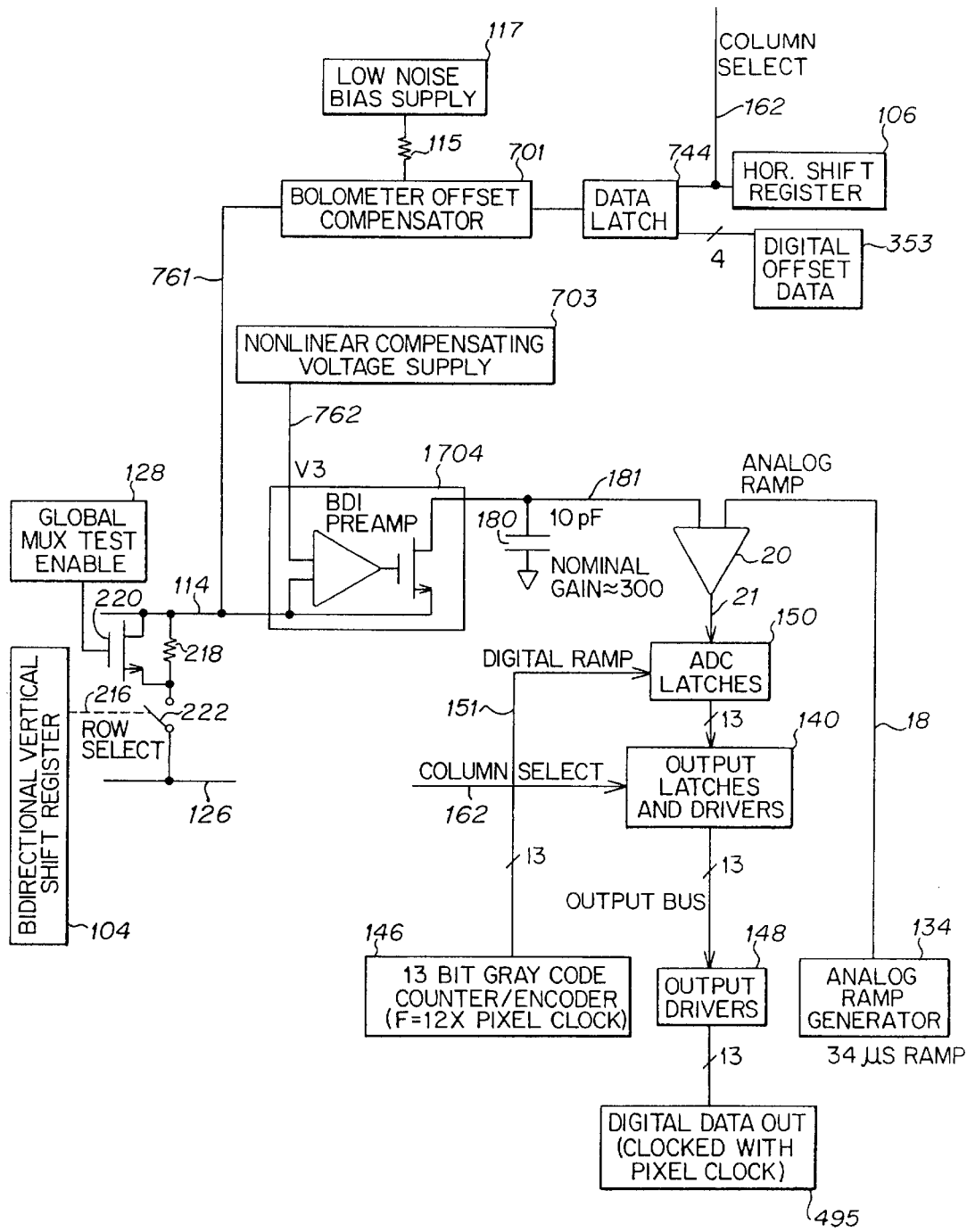

Refer now to FIG. 4B which shows another alternate example of microbolometer array compensation circuitry of the invention employing a bolometer offset compensator 701 connected in series with the load resistor 11 5, and the detector elements. Supplying a voltage bias to the bolometer offset compensator 701 is a low noise bias supply 117. It will be understood that the bolometer offset compensator and its control circuits are replicated for each column of detectors in the array. The alternate embodiment shown in FIG. 4B optionally may include a nonlinear compensating voltage supply 703 coupled to one input of a BDI preamplifier 1704. The other elements are connected in a manner similar to that described above.

Figure 4C:
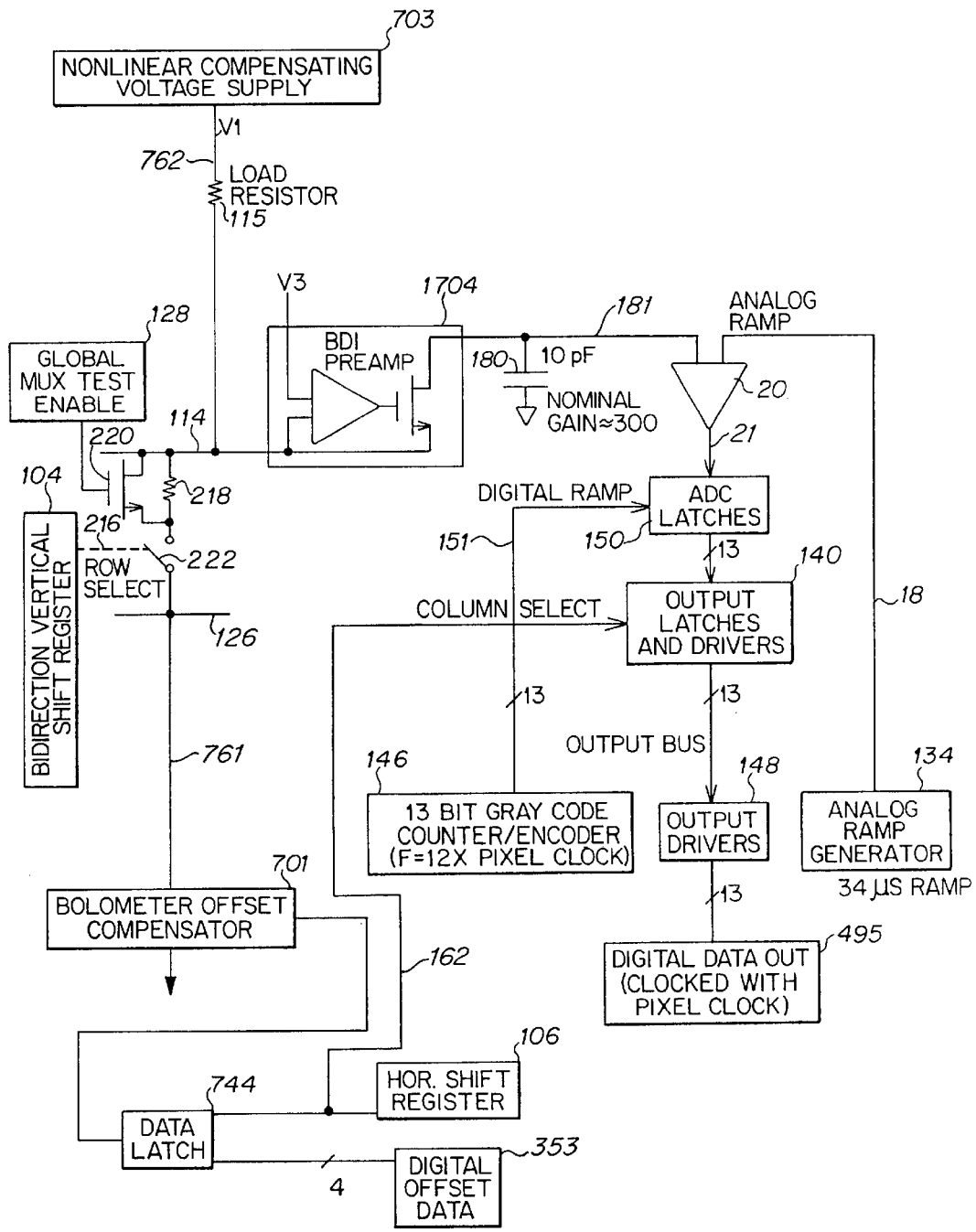

Refer now to FIG. 4C which shows another alternate example of microbolometer array compensation circuitry of the invention employing a nonlinear compensating voltage supply 703 coupled to load resistor 115. The other elements are connected in a manner similar to that described above with respect to FIG. 4A. The operation of the nonlinear compensating voltage supply is explained in more detail hereinbelow.

Figure 5:
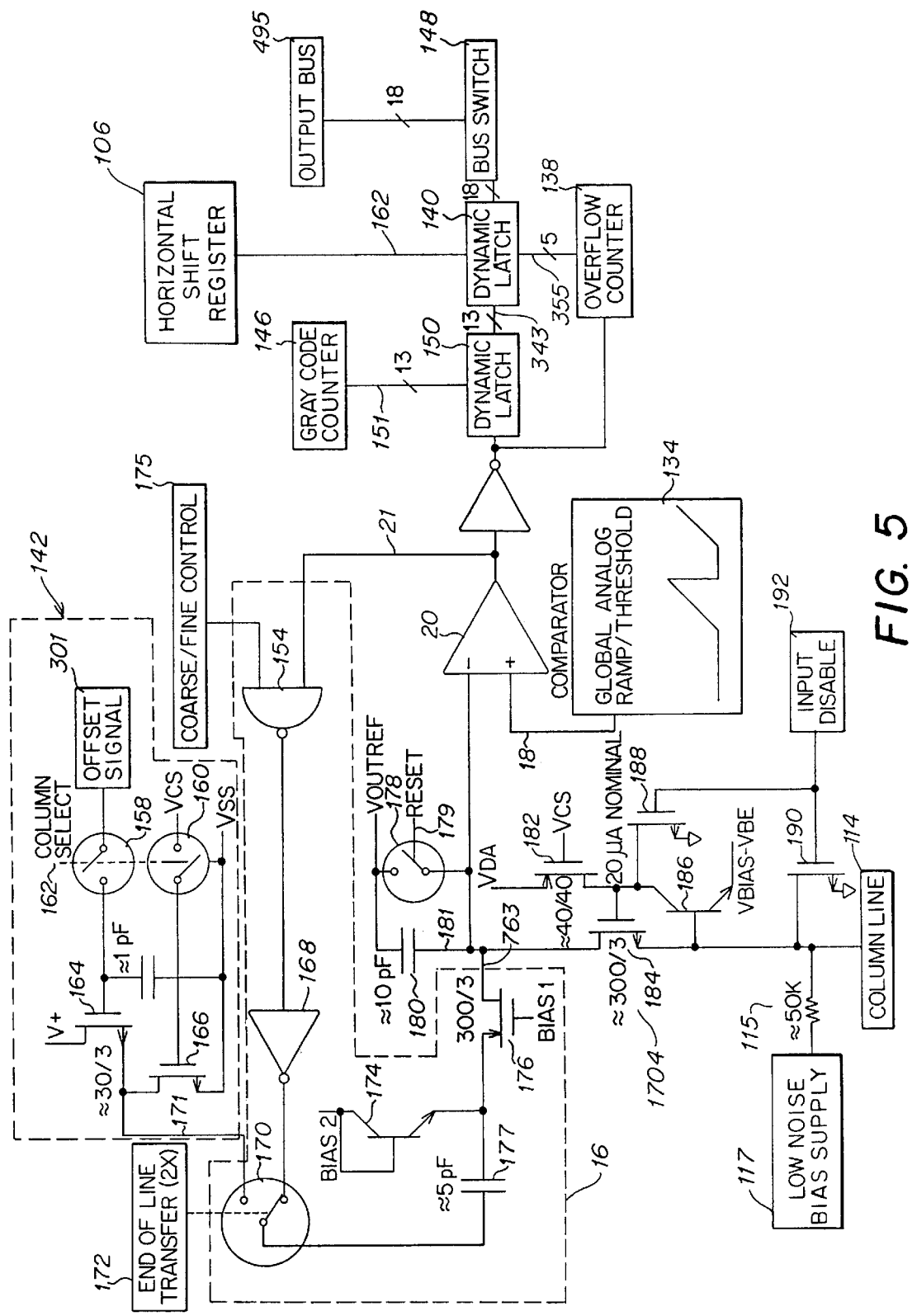
FIG. 5 shows a circuit schematic diagram of a column circuit of the invention.

Referring now to FIG. 5 which shows a more detailed example of a circuit schematic diagram of the column circuit of the invention shown in FIG. 4. Each column in the array may be coupled to an associated column circuit as shown in FIG. 5. The column circuit is centered around the comparator 20 which compares the voltage on the integration capacitor 180 with the reference voltage 18. The integration capacitor 180 is adjusted with an offset voltage 763 which is provided through transistor 176. The transistor has a bias signal which is controlled from off-chip electronics by a first bias signal and a second bias signal. The circuit has a charge injection capacitor 177. Bias 2 signal is provided through transistor 174 to set a bias voltage on the integration capacitor. Transisters 174, 176, and capacitor 177 from part of offset capacitor circuit 16. The coarse offset is provided by a sample and hold circuit 142 which is coordinated with the column select 162. An analog offset signal 301 is provided to the sample and hold circuit 142 from the four bit digital-to-analog converter 144 of FIG. 4. Switch 158 may be selected by the column select 162 to provide the offset signal 301 to a supply transistor 164. Alternately, if the offset signal 301 is not supplied, a reference voltage VCS is provided through source 160 to transistor 166. The offset signal 171 is provided through switch 170 which is controlled by end of line transfer signal 172. Either the offset voltage is provided or a coarse/fine control voltage 21 is provided from via NAND gate 154. If the coarse/fine control 175 is active and the comparator is active, then the output of the NAND gate is inverted to supply a predefined constant offset voltage in response to switch 170 through the end of line transfer signal 172. The capacitor 180 integrates the signal from the bolometer which is preamplified by the BDI amplifier 1704. The column line 114 provides a selected bolometer signal which is selected by the row select signal.

The signal is biased by a global bias offset voltage of less than 20 volts through a 50K resistor 115, for example. The input signal may be disabled with transistor 190 in response to input disable signal 192 which is provided to eliminate the bolometer signal during certain phases of operation of the circuit. A transistor 186 amplifies the bolometer signal to the pass transistor 184. The transistor 186 is provided with a voltage from transistor 182 and is controlled by transistor 188. The pass transistor 184 allows the bolometer signal to be integrated on the integration capacitor 180. Integration capacitor 180 may be reset by switch 178 in response to reset signal 179. The output of the comparator 20 may be provided in one example, to two sets of dynamic latches which allow the integration of column signals in a pipeline fashion where one signal is transmitted to the dynamic latch 150 while the previous sample is being read out of dynamic latch 140. The gray code count signal 151 and the column select 162 from the horizontal shift register 106 are provided to the latches 150 and 140, and to a bus switch 148 outputs the digital value 495 of the bolometer which has undergone coarse and fine conversion.

Figure 6:
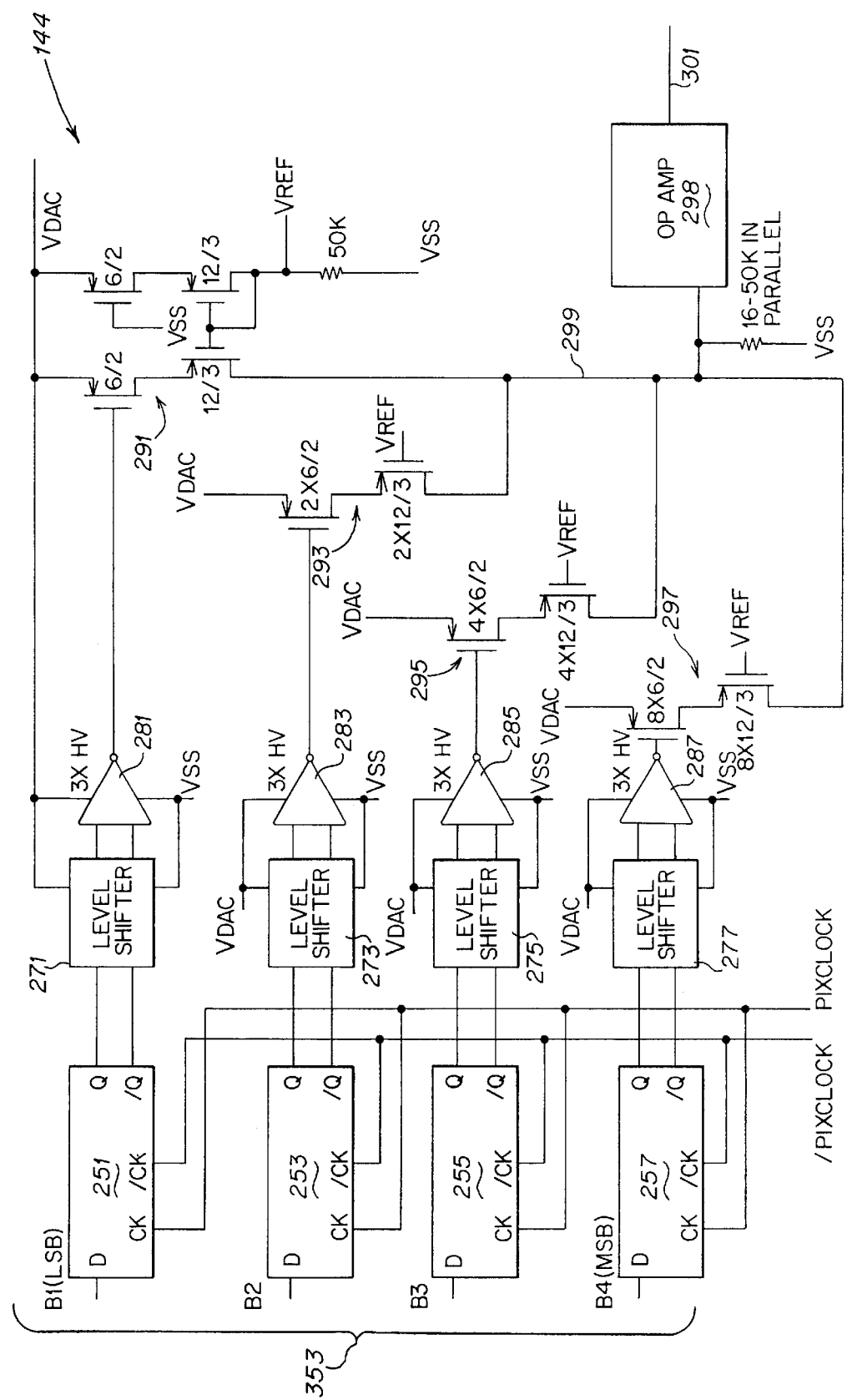
FIG. 6 schematically shows a digital-to-analog converter as employed in one embodiment of the invention.

Refer now to FIG. 6 which shows a digital-to-analog converter 144 as employed in one embodiment of the invention to provide the coarse offset signal to the integration capacitor. The offset signal on signal line 353 from the coarse offset controller 354 (FIG. 7), B1, B2, B3 and B4, are provided to data flip-flops 251, 253, 255 and 257 respectively. The outputs of the flip-flops are sent to level shifters to adjust the voltage output to provide for the analog conversion. Level shifter 271 provides amplifier 281 with a voltage. Amplifier 281 controls transistor pair 291 to provide voltage to output 299. Level shifter 273 controls operational amplifier 283 to control the gate of transistor pair 293. Level shifter 275 provides the voltage to amplifier 285 which controls the gate of transistor pair 295. Level shifter 277 controls amplifier 287 which controls the gate of transistor pair 297. Transistor pairs 291, 293, 295, 297 are all connected to output 299 which is provided to operational amplifier 298 which provides the analog signal 301 representing the four bit digital number.

Figure 7:
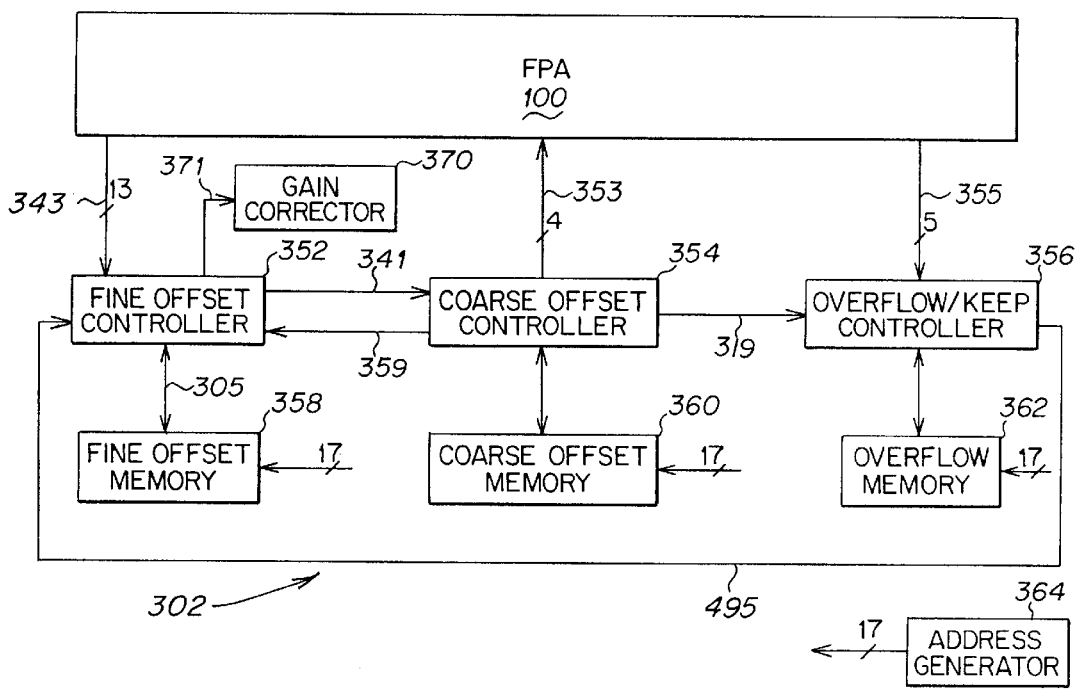
FIG. 7 shows a circuit schematic diagram of an offset controller as employed in one embodiment of the invention.

FIG. 7 shows a circuit schematic diagram of one embodiment of an offset controller as may be employed in the invention. Focal plane array 100 receives the offset signal on signal line 353, and outputs focal plane data 351 and focal plane overflow data 355. The focal plane data 351 is provided for each image sensor element of the array, i.e. each bolometer pixel. The focal plane overflow data 355 comprises a count of the number of times the internal analog-to-digital converter integration capacitor 180 has been reset. The coarse offset controller 354 provides the focal plane offset data 343 to the digital-to-analog converter that sets up the integration capacitor 180 in the digital-to-analog converter on the focal plane array 100. The fine offset controller 352 receives the focal plane array data 351 and provides a new fine offset output 341 to the coarse offset controller 354. The coarse offset controller 354 provides an offset adjust output 359 to the fine offset controller 352. The fine offset controller 352 and the coarse offset controller 354 combine to provide a coarse change signal 319 to the overflow controller 356.

The fine offset controller 352 is interfaced to the fine offset memory 358 which can also be written by an external controller using address generator 364. The coarse offset controller 354 has an interface to the coarse offset memory 360. The fine offset memory 358 and the coarse offset memory 360 contain a database that is structured to store the fine offset and the coarse offset for each element in the focal plane array, respectively. Therefore, each element in the focal plane array has an associated memory location in both the fine offset memory 358 and the coarse offset memory 360. This is paralleled by an overflow memory 362 that maintains a count of the number of analog-to-digital conversion cycles of the integration capacitor required for each element of the array. These cycles are required because the integration capacitor does not have enough capacity to integrate the entire signal as described above. The signal must be sampled and dumped until a final integration is left on the focal plane array for the last integration cycle.

In one example embodiment, the fine offset memory 358 and coarse offset memory 360 may be combined into a single offset memory of 24 bits. The 24 bits may be allocated by storing 14 bits of a fine offset value, 5 bits for the FPA's most significant bits, 4 coarse offset bits, and a 1 bit flag to indicate that the offset is changing. The 14 fine offset bits may be encoded by dedicating 13 significant bits and 1 fractional bit.

The fine offset controller 352 also supplies a signal to the gain corrector 370. In one example embodiment of the invention, there are 13 bits of focal plane array data 351 from the focal plane array 100 and 5 bits of overflow data 355. The coarse offset controller provides, in one example embodiment of the invention, 4 bits of offset data on signal line 353.

Figure 8:
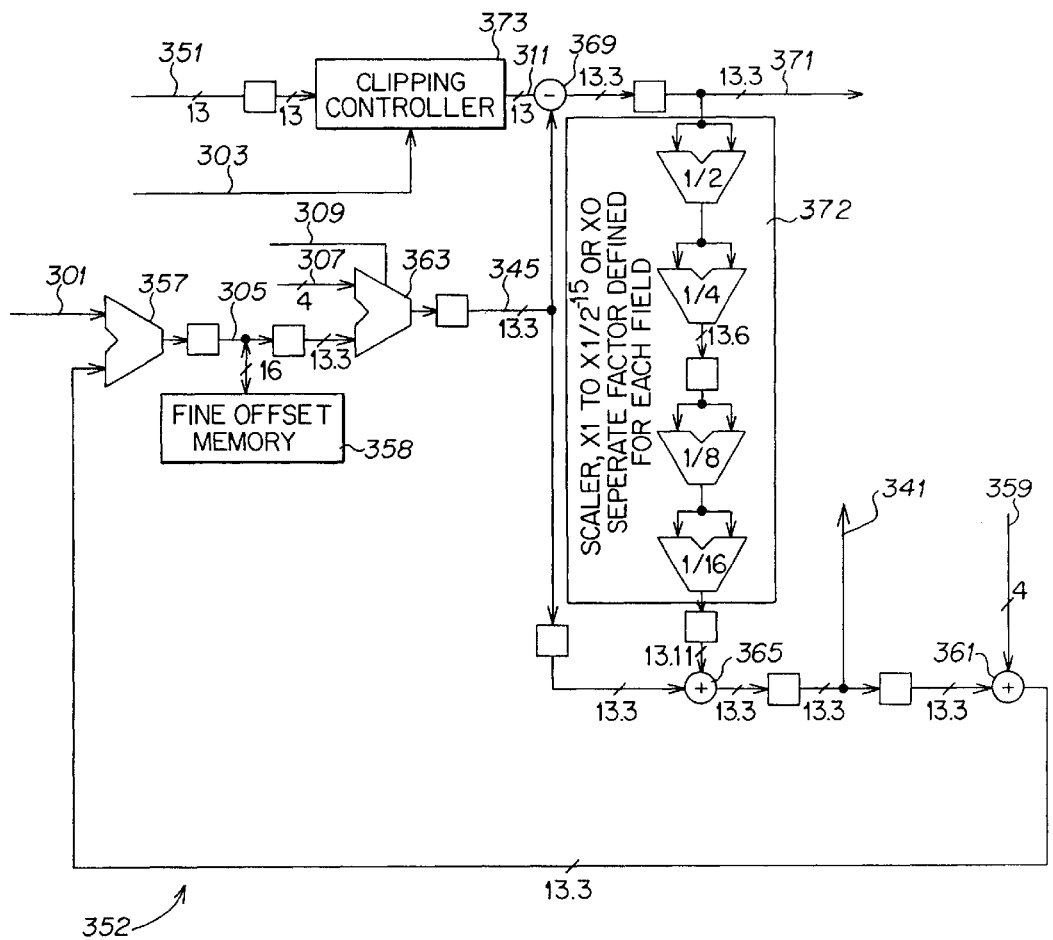
FIG. 8 shows a circuit schematic of a fine offset controller as employed in one embodiment of the invention.

Now referring to FIG. 8 which shows a more detailed circuit schematic of a fine offset controller 352 as employed in one embodiment of the invention. The fine offset controller may comprise a clipping controller 373, a scaler 372, a first fine offset multiplexer 357 and a second fine offset multiplexer 363. The fine offset memory 358 may have a 16-bit interface to an output 305 of a first fine offset multiplexer 357. In one embodiment, the first fine offset multiplexer 357 accepts write data on line 301 from an external data source or from the output of a new fine summation node 361. The coarse offset adjust signal 359 is provided to the new fine summation node 361 by the coarse offset controller 354 shown in FIG. 7. The output of summation node 361 is multiplexed by the first fine offset multiplexer 357 with the external data 301 to provides data 305 for the fine offset memory 358. The fine offset memory 358 contains fine offset information for particular pixel elements in the FPA 100. The output of the fine offset memory 358 is multiplexed with an offset base 307 which provides a mechanism to bypass the offset in response to the offset bypass signal 309.

The second fine offset multiplexer 363 provides a fine offset output 345 which, in one example, may be comprised of a 13-bit number with a 3-bit decimal point. The fine offset output 345 may be connected to a fine offset summation node 365 and a subtraction node 369. The subtraction node 369 clips the output of the focal plane array 100 by subtracting clipped data 311 from the fine offset output 345 to provide offset data 371. The clipping controller 373 is controlled by clip signal 303 and operates on data 351 using a standard clipping method. The focal plane data is 13 bits. The output of the subtraction node 369 is processed through scaler 372. Scalar 372 scales data for summation with the fine offset at fine offset summation node 365.

Figure 9:
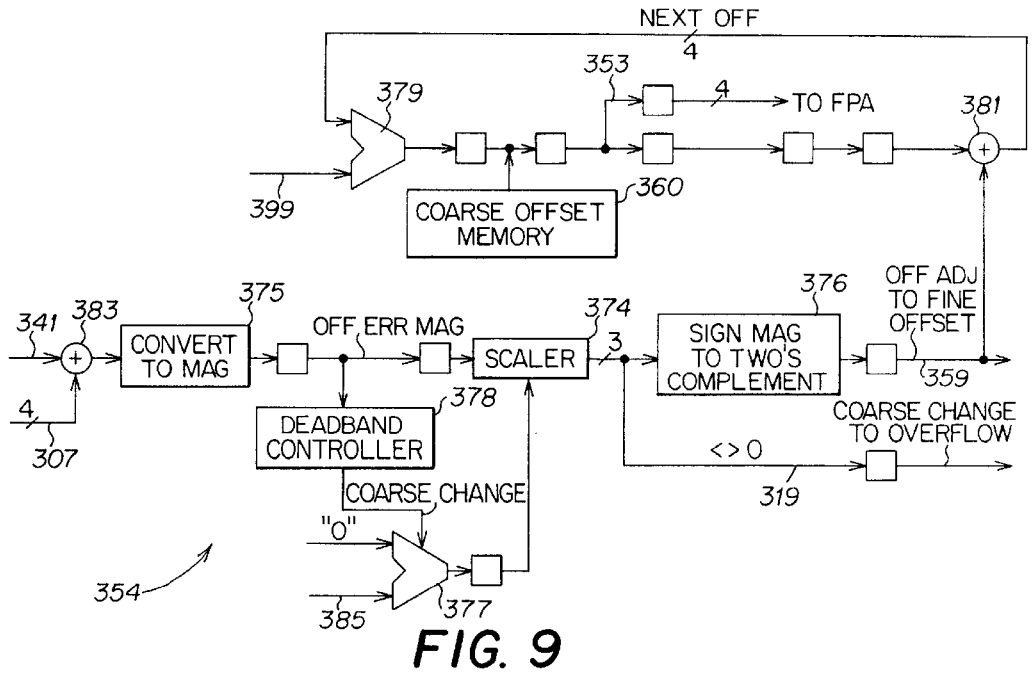
FIG. 9 schematically shows a coarse offset controller as employed in one embodiment of the invention.

Now referring to FIG. 9 which shows a coarse offset controller as employed in one embodiment of the invention. The new fine offset signal 341 is summed with an offset base signal 307 in summer 383, which provides a signal to convert the outputs of the summer to an offset error magnitude by converter 375. Deadband controller 378 takes the offset error magnitude and controls a multiplexer 377 to provide a scaler with either 0 or a coarse offset scale factor 385. The scaler 374 provides an offset change signal which is used as an overflow or is converted to twos complement from sign magnitude in converter 376. The scaler 374 provides the offset adjust signal 359 which is used by the fine offset controller 352. The offset adjust signal 359 is summed in summation node 381 with the coarse offset from the coarse offset memory 360 and is used as the next offset argument which is multiplexed with the write data 399 in multiplexer 379. The external controller can write to the coarse offset memory 360 through write data 399. The coarse offset memory 360 outputs the offset data to the focal plane array 100 on signal line 353.

In operation, the offset controller may be operated in a plurality of modes including chopper mode, shutter mode, vidicon mode and calibrate mode. Each mode produces a different type of reference image used to compensate for pixel offset non-uniformities.

In the chopper mode, in one example, a germanium or opaque chopper is synchronized with the FPA frame rate to create blurred and in-focus images. Coarse and fine offset coefficients are computed using a blurred or blocked image as a reference image. The coefficients may advantageously be computed periodically and dynamically as the chopper is operated to create such images. The blurred or blocked images are passed through a first order low pass recursive filter to create a reference image. Such first order low pass recursive filters are known in the art. Each pixel emanates a signal comprised of a DC pixel offset modulated by an image signal of interest, where the image signal is relatively small in comparison to the DC offset. The analog-to-digital converter operates within a predetermined range of values, so the signal from the pixel may advantageously be positioned near the center of the analog-to-digital range by applying offset characteristics for each pixel. The coarse offset coefficient for a pixel is computed while viewing a blurred or black image by decreasing the 4-bit offset value if the pixel value lies within an upper range of the analog-to-digital converter. If the pixel value is in a lower range of the analog-to-digital converter, the offset is incremented. A one-bit flag is set to freeze the video display until the offset values can be computed. The output of the offset controller is, therefore, given as the difference between the in-focus image minus the reference image. Fine offset may optionally be used, if it is, the one-bit flag is cleared once the fine offset value has been computed.

When viewing in-focus images, analog-to-digital under range and over range conditions are indicated by the five most significant bits of the pixel data. If this value changes an overflow condition exists. A decrease in the value indicates an underflow in which case the offset controller clamps the output to 0. An increase in value means an overflow condition has occurred and the offset controller clips the output to all 1's.

In shutter mode, the offsets are only computed when the shutter is closed. The shutter may be closed periodically under computer control or manually. Images acquired while the shutter is closed are passed through a first order low pass recursive filter to create a reference image. Coarse and fine offsets may be calculated as described with reference to the chopper mode. The output of the offset controller is given as the difference between the open shutter image minus the reference image. The operation of the device is similar to the offset controller in the chopper mode.

In vidicon mode, which has no shutter, the offset coefficients are computed continuously as in the chopper mode.

Images are passed through a first order low pass recursive filter to create a continuously changing reference image. Coarse and fine offsets, if used, may be continuously computed in the manner described above with respect to the chopper mode. The offset controller output is the difference between a current image being viewed and previously averaged images.

The offset controller can be operated in a calibration mode where an external computer such as a INTEL 486 or PENTIUM based personal computer accesses the offset coefficient memory. The external computer can read and write the offset coefficients which may also be updated under instruction by the computer.

Figure 10:
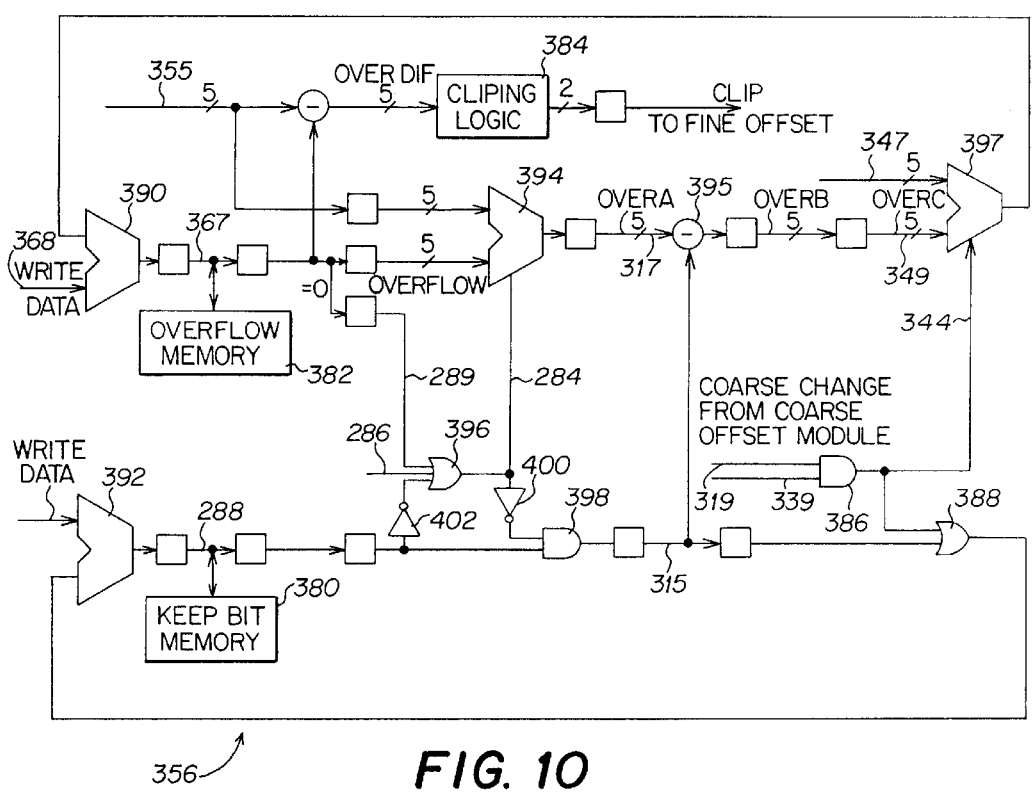
FIG. 10 schematically shows an overflow controller as employed in one embodiment of the invention.

Refer now to FIG. 10 which shows the overflow controller of the invention. The overflow memory 382 stores an overflow count for each bolometer on the focal plane array 100. Multiplexer 390 drives overflow memory bus 367 with either data from the controller 318 or from multiplexer 397. Multiplexer 397 provides multiplexer 390 with either a keep count 347 or an overflow count 349 depending on the state of a keep start signal 344. The keep start signal 344 is the logical AND 386 of the coarse change signal 319, from the coarse offset controller, and the keep enable signal 339. The overflow count 349 is the result of a subtraction. Subtractor 395 subtracts the overflow signal 317 from the keep data signal 315. Multiplexer 394 selects either the overflow memory bus 367 or the focal plane overflow count 355. Keep bit memory 380 stores a keep bit from OR gate 388 or a keep bit from the controller 318. The keep bit bus 288 provides a first signal to three input OR 396. An overflow zero signal 289 provides a second signal, and the keep disable control signal 286 provides a third signal. OR 396 provides the keep done signal 284 to control multiplexer 394. AND 398 provides a signal to OR 388. OR 388 also is connected to the keep start output 344 of AND 386.

Figure 11:
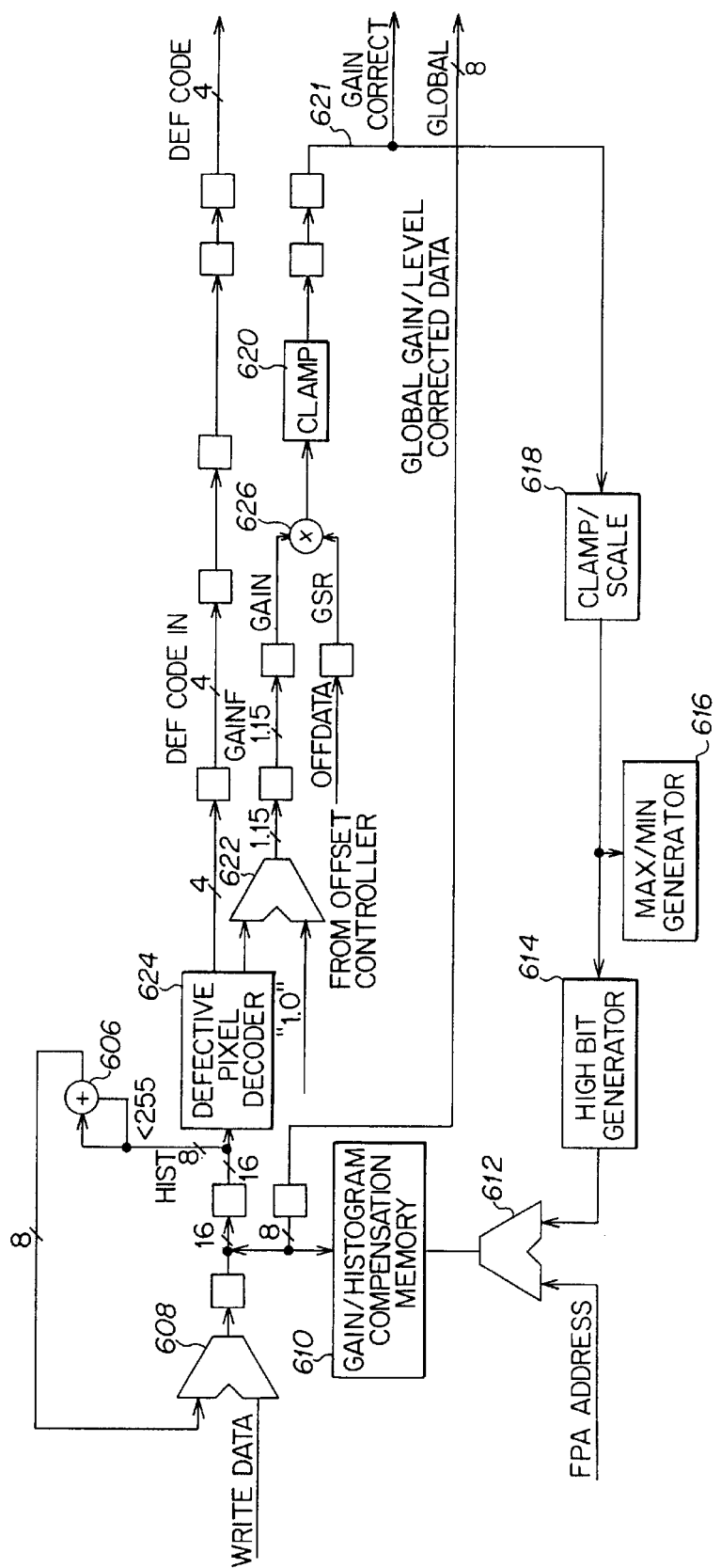
FIG. 11 schematically shows a gain correction image correction controller as employed in one embodiment of the invention.

Now referring to FIG. 11 which shows a schematic of a gain correction image correction controller as employed in one embodiment of the invention. The gain controller 304 provides gain coefficients for the offset corrected data from the focal plane array 100. The gain controller 304 further compiles a histogram of the data gathered by the focal plane array 100.

A gain/histogram/compensation memory 610 provides data including a gain compensation factor. The data further includes a code for defective pixels. The code provides information on whether a pixel is defective and may also include neighboring pixel address data. A defective pixel decoder 624 receives the data and determines whether a current pixel is defective. If the current pixel is defective, the defective pixel decoder 624 may use the neighboring pixel data to determine a neighboring pixel to substitute for the defective pixel. The defective pixel decoder 624 passes the gain compensation factor to a multiplexer 622 to multiply the offset signal by the gain factor. Multiplexer 622 passes the gain compensation factor with unity gain or as provided by defective pixel decoder 624 to a multiplier 626. The offset controller 302 provides offset corrected data from the focal plane array 100 to the multiplier 626. The multiplier 626 multiplies the offset corrected data with the appropriate gain correction factor. A clamp 620 may receive the multiplied data. The clamp 620 may function as a window to pass a selected predetermined range of values. The gain corrected data may be provided to a display unit for display.

In one preferred embodiment, the gain correction factor may comprise one bit to the left of the decimal point, and fifteen bits to the right of the decimal point. The offset corrected data may comprise thirteen bits to the left of the decimal point, and one bit to the right of the decimal point. The clamp may pass thirteen bits to the left of the decimal point and 1 bit to the right of the decimal point from a thirty bit multiplied data output.

The gain corrected data may also be provided to construct a histogram. A clamp/scale unit 618 receives the gain corrected data and clamps and scales the data to a predetermined scale. A max/min generator 616 receives the scaled data. The scaled data is also provided to a high bit generator 614. The high bit generator 614 adds a high bit to the scaled data. Multiplexer 612 receives the data from the high bit generator 614 and provides the data as an address to the gain/histogram/compensation memory 610.

The gain controller 304 stores a histogram in gain/histogram/compensation memory 610. Summer 606 receives a value of the address resulting from the pixel output and increments the value by one, as long as the value is less than a predetermined value, for example, in one example embodiment, 255. The summer provides the incremented value to a multiplexer 608. Multiplexer 608 writes the incremented value back into the gain/histogram/compensation memory 610. All pixels on the focal plane array 100 are scanned.

Figure 12:
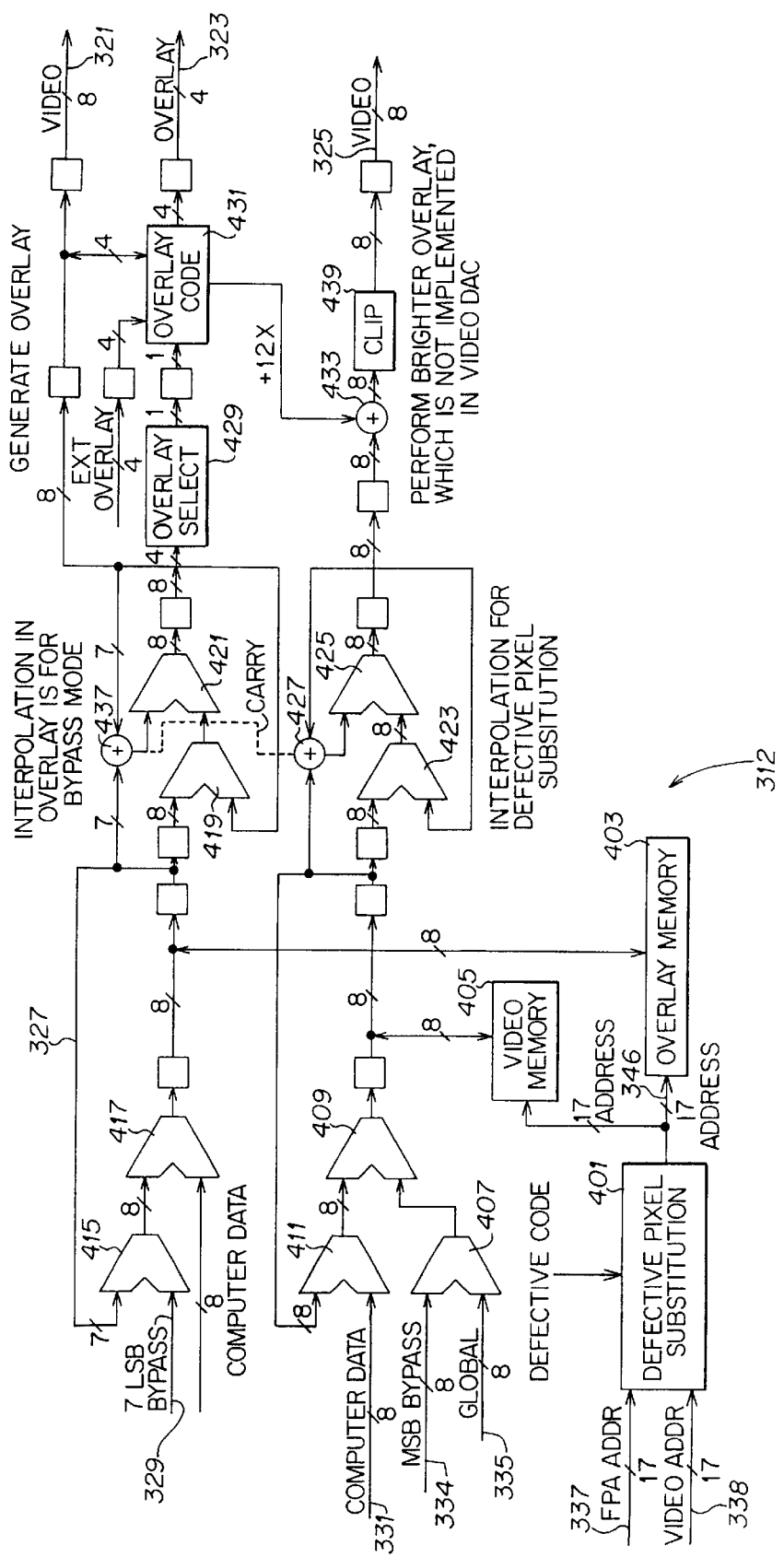
FIG. 12 shows a video processor of the invention.

Refer now to FIG. 12 which shows the video processor of the invention. The video processor provides an 8-bit video signal, a 4-bit overlay signal and a bright overlay signal. The 8-bit video signal is provided by the summation of the output of multiplexer 421 with the output of multiplexer 417. Multiplexer 417 multiplexer computes 8-bit data from the focal plane array processing system with a feedback signal through multiplexer 415 to provide a 7-bit least significant bit bypass. The summation node 437 provides multiplexer 421 which also oversees the input and output of multiplexer 419. Multiplexer 419 receives the output of the overlay memory 403. Defective pixel substitution is implemented by multiplexer 425 and multiplexer 423 with multiplexer 423 inputting 8-bits of data to multiplexer 425 which receives the output of summation node 427. Summation node 427 sums the output of multiplexer 425 as an input with data from the video memory 405. Defective pixel substitution processor 401 provides the 17-bit address 346 for the video memory where the defective pixel data is substituted. An 8-bit computer signal is fed to multiplexer 411 which also receives feedback data from multiplexer 409. The output of multiplexer 411 is multiplexed in multiplexer 409 with the eight most significant bits multiplexed with the eight most global bits through multiplexer 407. The defective pixel substitution processor 401 provides a 17-bit address to the overlay memory 403 which provides data to multiplexer 419 as described above. Clipping processor 439 clips the output of summation node 433 which provides an overlay signal from overlay processor 431 and the output of the defective pixel substitution circuitry produced by multiplexer 425. Globally scaled data from the focal plane array is provided through multiplexer 407 and gain corrected data is provided to multiplexer 415.

Figure 13:
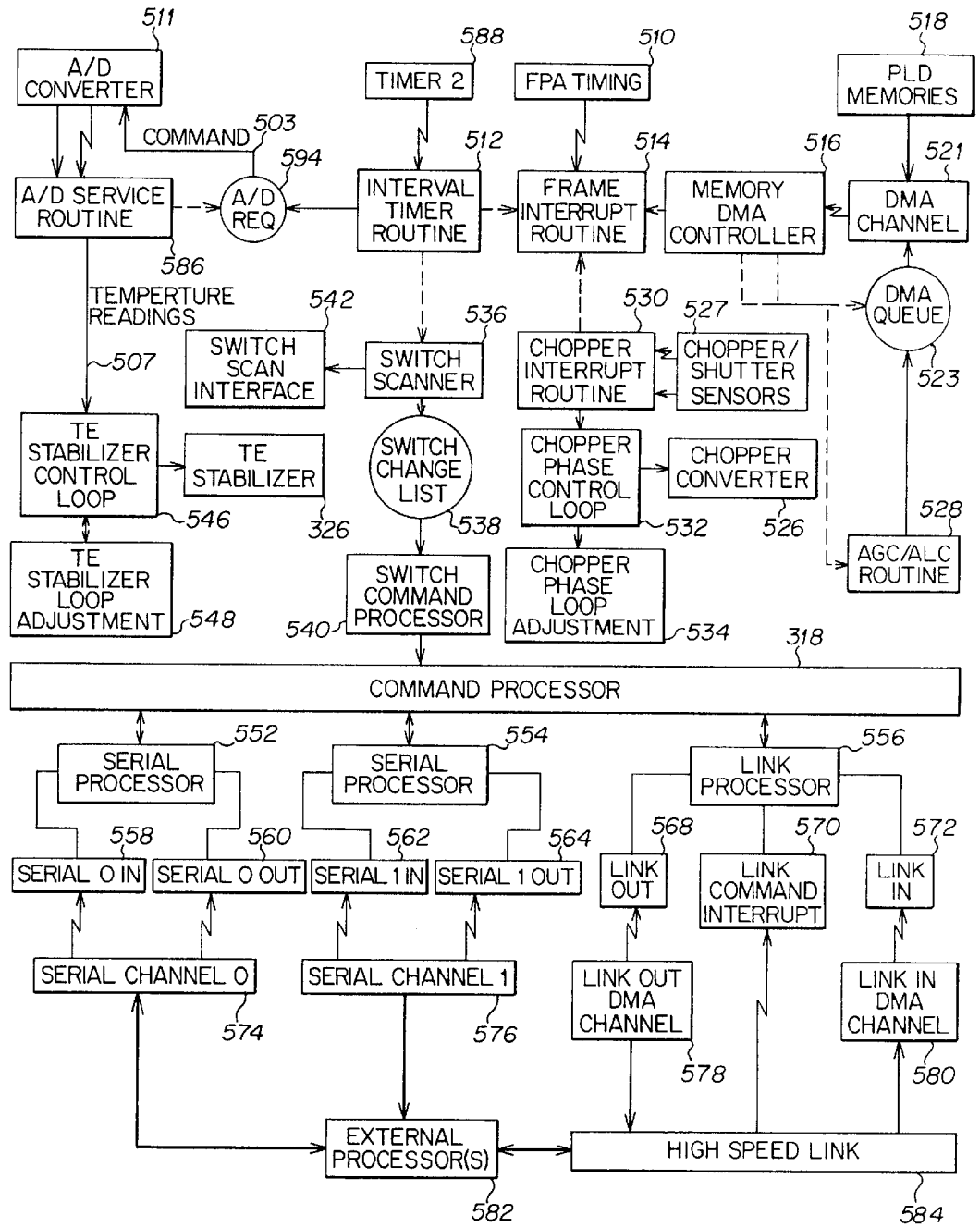
FIG. 13 shows a schematic of an interface routine and an interface structure for a command processor as employed in one embodiment of the invention.

Refer now to FIG. 13 which shows a schematic of the interface routine and the interface structure for the command processor of the invention. The controller 318 has a first serial processor 552 and a second serial processor 554 interfaced to serial input/output (I/O) port.

A high speed link 584 interfaces to an external processor 582. The external processor 582 controls serial link 1-576 and serial link 0-574. High speed link 584 interfaces through memory by DMA channel 578 and DMA channel 580. The DMA channel 578 is a output channel that interfaces to link controller 568 which interfaces to link processor 556. The high speed link also communicates to a link command interpreter 570. The link processor 556 accepts data from the high speed link 584 through link controller 572 through DMA channel 580. Link processor 556 interfaces to the controller 318.

FPA timing controller 510 provides frame interrupt routine 514 with timing data. Timer_2 588 provides signals for the interval timer routine 512 which schedules the digital-to-analog converter requests 594. The digital-to-analog converter requests command 503 is provided to the analog-to-digital converter 511 which operates the analog-to-digital converter service routine 586. Temperature readings 507 are provided to TE stabilizer control 546. The TE stabilizer 326 is controlled by the TE stabilizer control 546. The TE stabilizer 326 has a TE stabilizer loop adjustment 548. Switches to control the device have an interface 542 which is scanned by switch scanner 536. The timer routine provides polling for the switch scanner as well as the frame interrupt routine 514 and the analog-to-digital request 594. Switch scanner provides data to the switch change list 538 which provides data to the switch command processor 540. The chopper interrupt routine 534 receives data from the chopper shutter sensors 527. The chopper phase control loop 532 is controlled by the chopper routine 530. The chopper converter 526 is controlled by the chopper phase control loop 532. The chopper phase loop is adjusted in 534. The DMA memory controller 516 provides service for DMAQ 523. The DMA channel 521 accesses the system memory 518. The automatic gain control routine 528 interfaces to the memory through the DMAQ 523 controlled by DMA controller 516.

Figure 14:
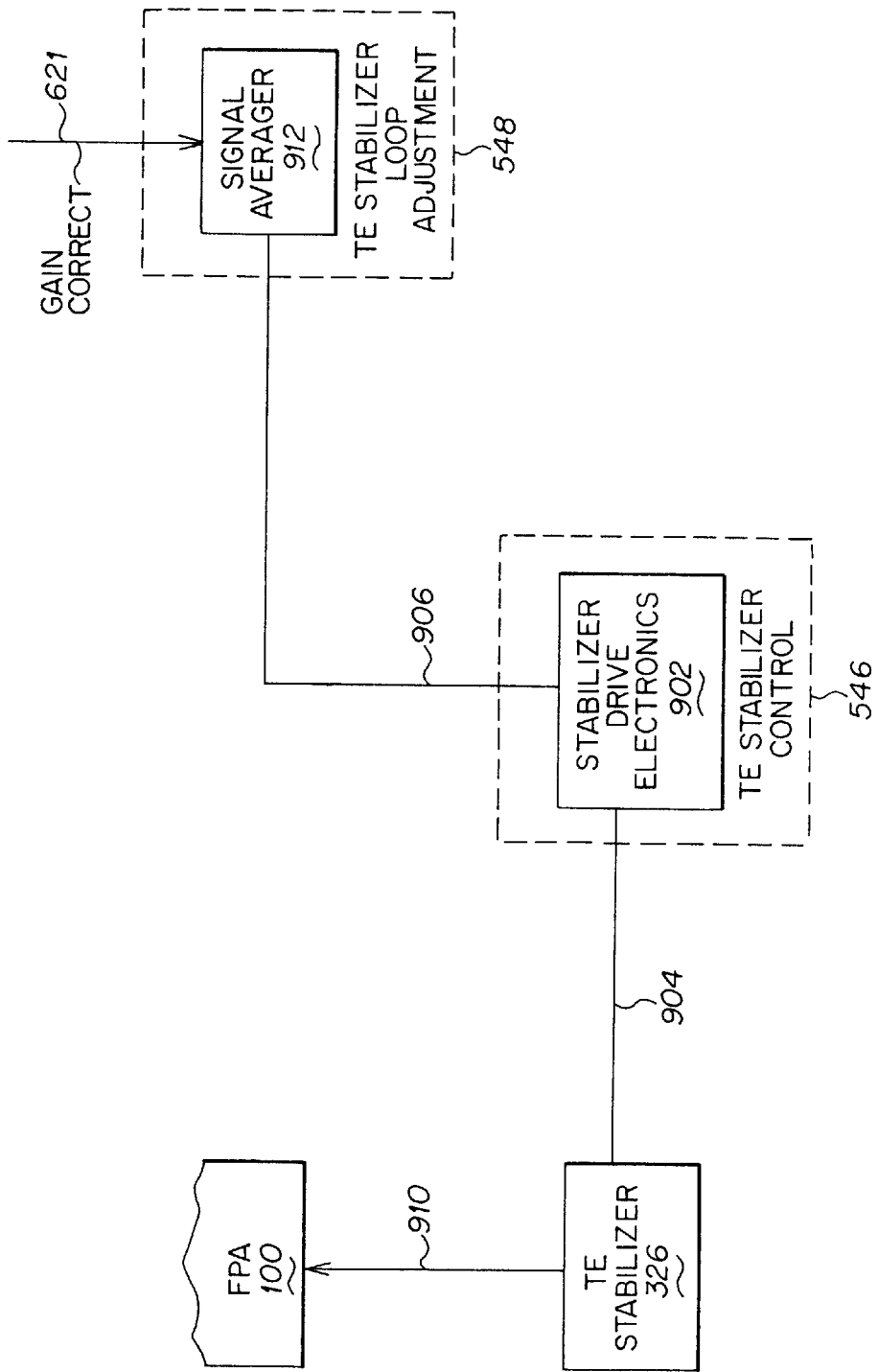
FIG. 14 schematically shows a block diagram of one example of a thermal stabilization apparatus for a microbolometer focal plane array as embodied in accordance with the present invention.

Now referring to FIG. 14, there shown is a block diagram of one particular example of a thermal stabilization apparatus for a microbolometer focal plane array as embodied in accordance with the present invention. The apparatus comprises the microbolometer focal plane array 100 for providing temperature data from each of a plurality of microbolometers. As described above, the data from FPA 100 may be processed to produce a gain corrected signal 621 from the gain/image correction controller 304 as best shown in FIG. 11. The TE stabilizer loop adjustment 548 may comprise a means for determining an average signal 912 coupled to the gain corrected signal from the gain/image correction controller 304. The average signal determining means 912 comprises a feedback signal output 906. An average signal representative of the average temperature of the array of microbolometers, is determined from the gain corrected signal so as to generate a feedback signal on the feedback signal output 906. The feedback signal may advantageously be proportional to the average signal. The TE stabilizer control 546 may comprise a means for generating a temperature control signal 902 including an input for accepting the feedback signal output 906. The temperature control signal means 902 includes a temperature control output 904 for carrying a temperature control signal proportional to the feedback signal. A thermal stabilizer 326 is in contact with the microbolometer focal plane array. The thermal stabilizer 326 has an input coupled to the temperature control output and responds to the temperature control signal to adjust the average temperature of the microbolometer focal plane array 100 as indicated by coupling 910.

In one embodiment of the apparatus of the invention the thermal electric stabilizer 326 may advantageously comprise a thermoelectric cooler. The means for determining an average signal 912 may advantageously comprise a micro-processor or be executed as a computer program carried out in the controller 318. The temperature control signal generating means 902 may comprise a conventional power amplifier.

In useful embodiments of the apparatus of the invention the average signal determining means may be coupled to receive data from each microbolometer in the FPA or from a selected portion of microbolometers in the array. In this way, the method and apparatus of the invention, for the first time, exploits the temperature sensitivity of the FPA bolometer elements to stabilize the array itself at the average temperature of the bolometer elements in the array.

In operation. the method of the invention provides a computer controlled method for thermal stabilization of a microbolometer focal plane array wherein each process step is implemented in response to a computer generated command. The computer controlled method comprises the steps of:

A. reading out temperature data from each of a plurality of microbolometers in the microbolometer focal plane array;

B. determining an average signal from the temperature data;

C. generating a feedback signal where the feedback signal is proportional to the average signal;

D. generating a temperature control signal proportional to the feedback signal; and E. stabilizing the temperature of the microbolometer focal plane array by adjusting the average temperature of the microbolometer focal plane array in response to the temperature control signal.

In one particularly advantageous example, the step of stabilizing the temperature comprises the step of adjusting the temperature of a thermal electric stabilizer coupled to the microbolometer focal plane array. Temperature adjustment may be done continuously or at periodic intervals as desired and as may depend upon the application and operational environment.

In one alternate embodiment of the invention using a separate temperature sensor on the array substrate, the TE stabilizer may keep the FPA temperature stable to within 100 microdegrees kelvin for the following parameters:

sensor resistance: $5K\Omega \leq R \leq 20K\Omega$ temperature coeff: $-2\%/deg.$ Kelvin A separate temperature sensor circuit may be implemented by placing the sensor into one leg of a differential bridge. The two power leads to the bridge may be automatically switched so that differential measurements may be taken with the bridge powered both ways to cancel out any drift in a dc driving source. The bridge resistors have a value R, equal to the resistance of the sensor. To obtain an absolute temperature accurate to within 1 degree kelvin, for the temperature coefficient of $-2\%/deg.$ K, the value of R must be accurate to within 2%. For the given range of sensor resistance, there may exist N total different values for the bridge:

$1.02^N=(20K/5K)$ $N=\log(4)/\log(1.02)$ $N=70$

Thus, each sensor must be measured to select the appropriate resistors for assembly. The voltage difference across the bridge for a driving voltage of 12 volts will be approximately 6 μv for a 100 μdeg. change in temperature. This voltage will then be amplified by approximately 100,000 and sampled by an analog-to-digital converter for input to the background processor. The processor may be used to control the power drive circuits for the TE stabilizer.

Figure 15:
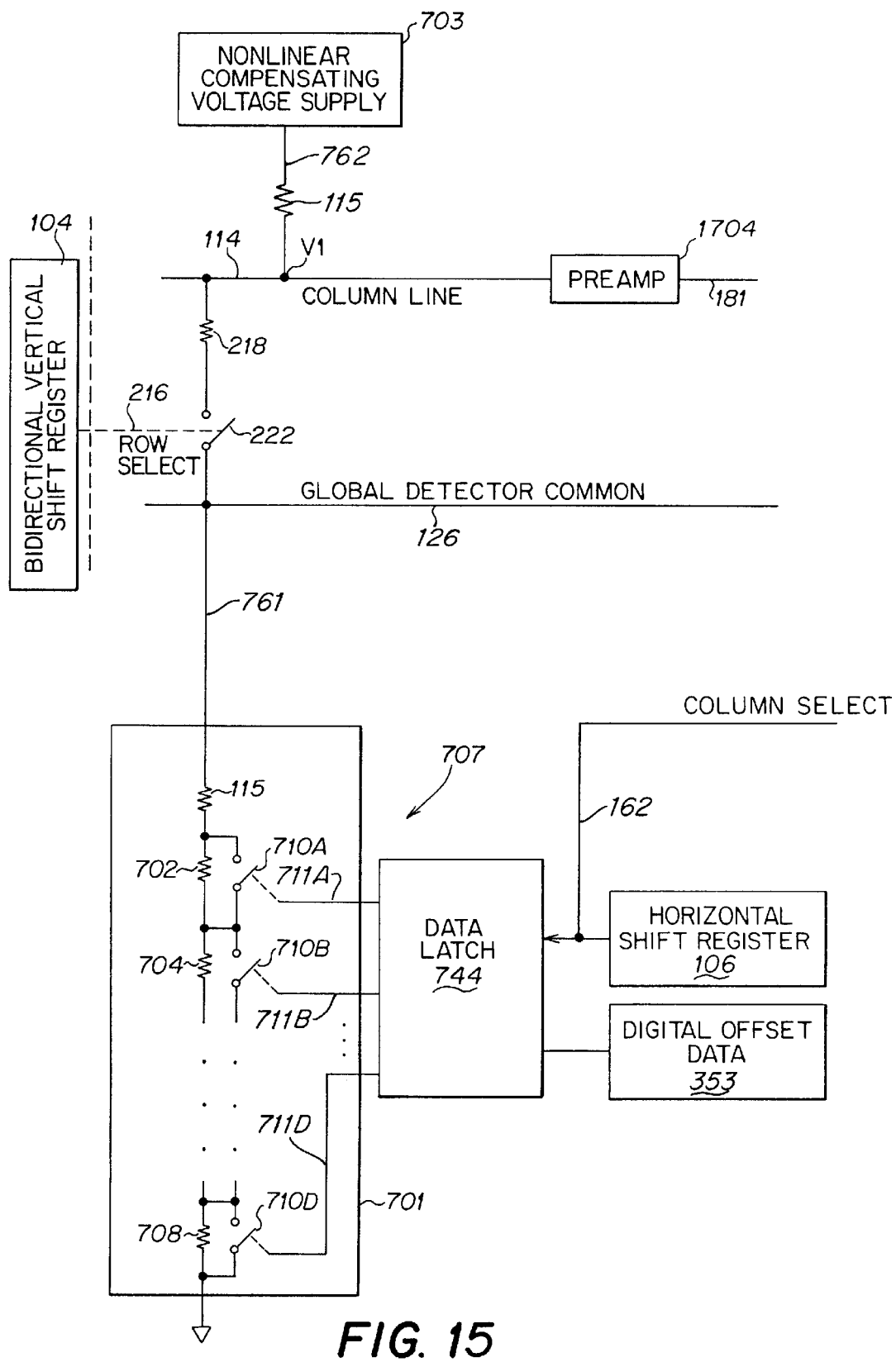
FIG. 15 shows an alternate embodiment of a bolometer offset compensator circuit as contemplated by an alternate embodiment of the invention.

Now refer to FIG. 15 which shows an alternate embodiment of a bolometer offset compensator circuit as contemplated by the present invention. As described above each column of the focal plane array is coupled to a bolometer offset compensator 701. Thus the bolometer offset compensator 701 and associated circuits, designated by arrow 707, are replicated on the FPA integrated circuit chip for each of the M columns. The bolometer signal on column line 114 is selected with row select line 216 to connect to BDI preamplifier 1704. The signal from the bolometer on column line 114 is the signal being compensated by the bolometer offset compensator 701. In the example shown, the bolometer offset compensator 701 comprises first through sixth compensating resistors, some of which are shown for illustrative purposes as compensating resistors 702, 704, and 708, each individually coupled to a plurality of switches 710A, 710B and 710D. The plurality of switches are coupled and controlled by the outputs 711A, 711B, and 711D of, for example, a six bit data latch 744. The six bit data latch 744 is enabled by the horizontal shift register 106. Digital offset data 353 selects the particular resistor combination through data latch 744. In one embodiment of the invention, the first through sixth compensating resistors may have values in the nominal range of 1200 ohms to 8200 ohms and are coupled to a load resistor 115 of about 145 kohms, for example. The embodiments shown herein are meant by way of illustration, not limitation, and other equivalent values and combinations of compensating resistances or equivalent circuitry may be used without departing from the spirit and scope of the invention. In one embodiment (FIG. 4A) nonlinear compensating voltage supply 703 supplies voltage 762 to the bolometer offset compensator 701.

Figure 15A:
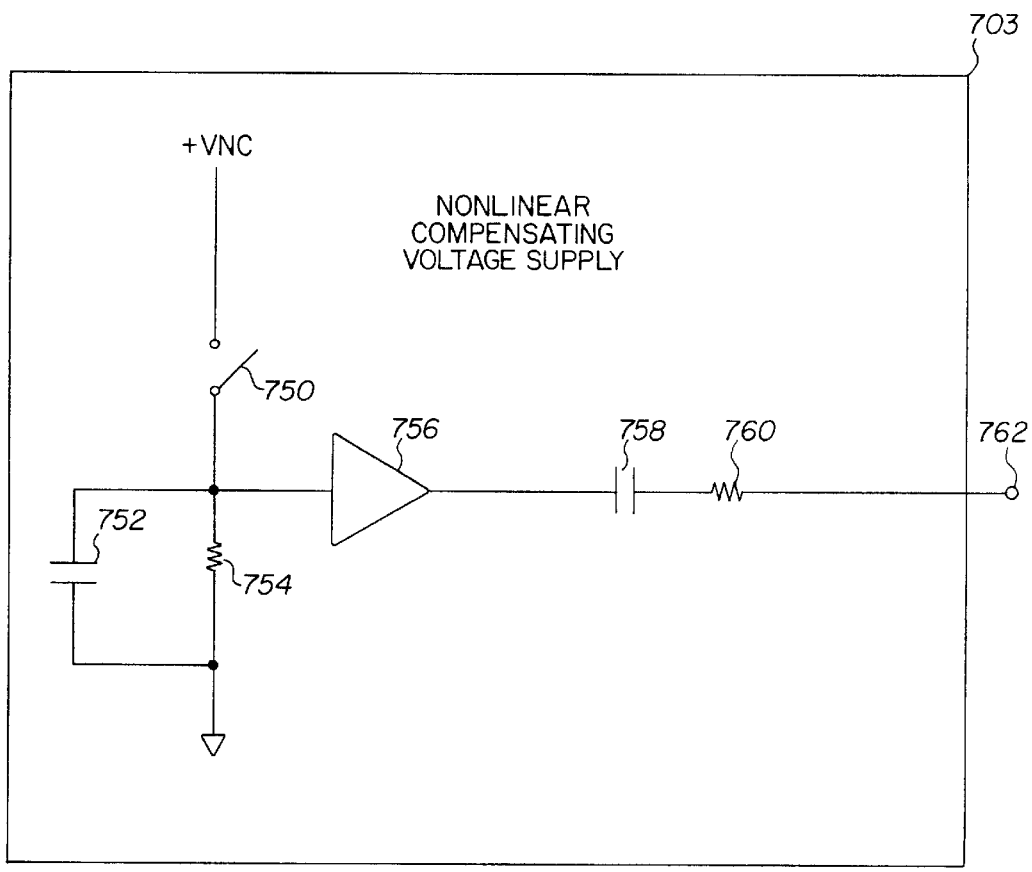
FIG. 15A schematically shows one example of a nonlinear compensating voltage supply as contemplated by an alternate embodiment of the invention.

Now refer to FIG. 15A, FIG. 15A schematically shows one example of a nonlinear compensating voltage supply 703 as contemplated by an alternate embodiment of the invention. The nonlinear compensating voltage supply comprises a switch 750 connected to a capacitor 752 that is connected in parallel with resistance 754. When closed, switch 750 applies a voltage, VNC, to amplifier 756. Amplifier 756 may advantageously comprise a unity gain amplifier having an output 762 through an output capacitor 758 connected in series to an output resistance 760. Referring again to FIG. 4A, the output 762 may be connected to node V1 or, in an alternate embodiment, to node V3 so as to control the BDI preamplifier. The switch 750 may advantageously be activated synchronously with the detector row select. As will be appreciated by those skilled in the art having the benefit of this disclosure, the amplifier 756 may comprise a unity gain inverting operational amplifier or a unity gain non-inverting operational amplifier depending upon the integrated circuit technology for any specific application.

Figure 16:
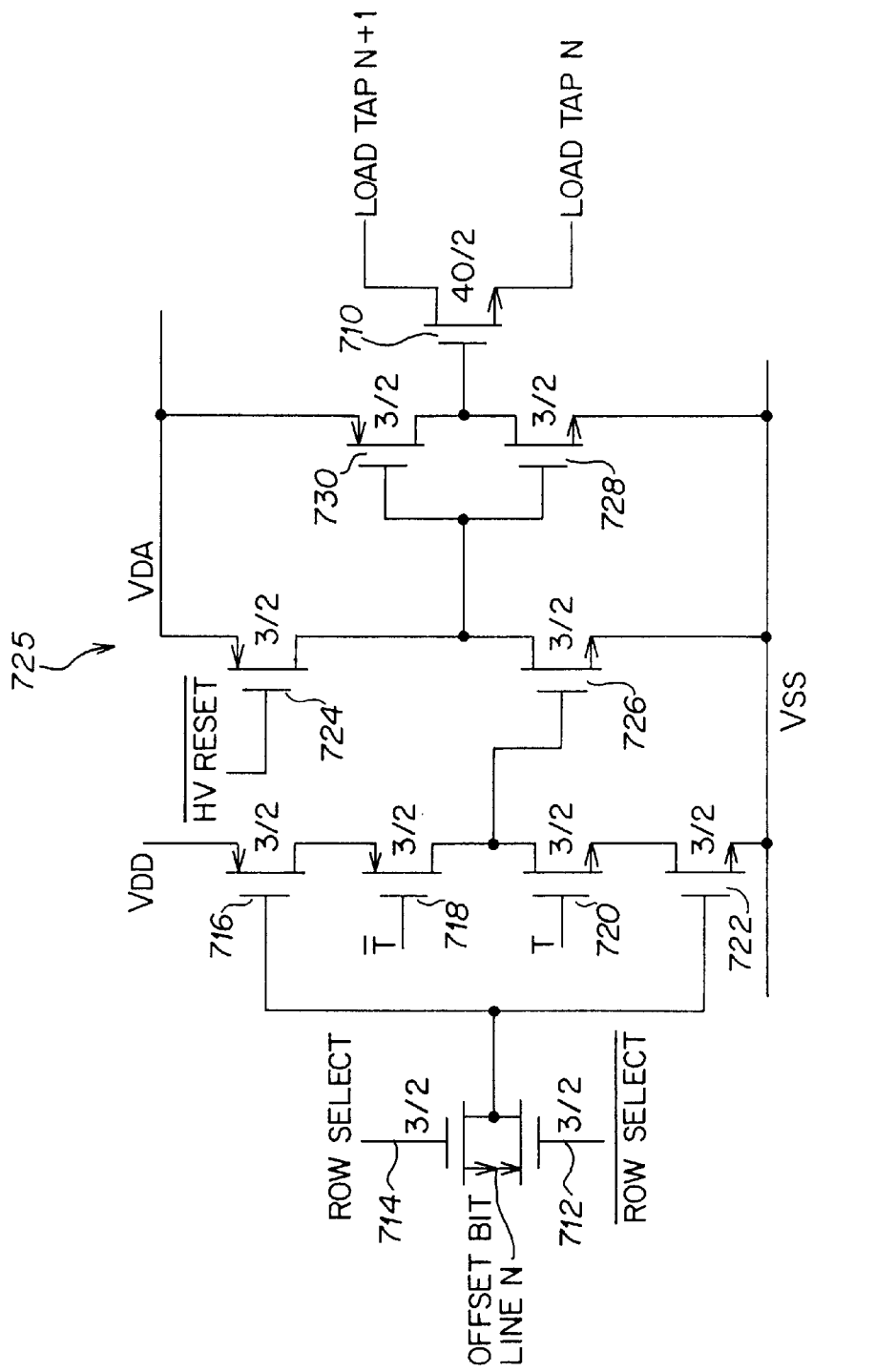
FIG. 16 shows an example of a one bit latch used in a six bit data latch as employed in an alternate embodiment of the invention.

Refer now to FIG. 16 which shows an example of a one bit latch 744A used in the six bit data latch 744. Bit latch 744A may be coupled to a level shifter circuit 725 for changing the voltage level from the input to the output. The level shifter 725 may be advantageously configured to decrease n-channel on resistance. The circuit of FIG. 16 may advantageously be duplicated a plurality of times for each compensating resistor. In one example where the bolometer offset compensator 701 employs six compensating resistors, identical data latch circuitry may advantageously be fabricated six times for each of M columns on the FPA chip. In a preferred embodiment, the data latch 744 comprises complementary metal oxide semiconductor (CMOS) transistors.

At the input, each bit latch 744A comprises row select transistors 714, 712 configured to dynamically latch and select the Nth offset bit. Transistor 714 is controlled by a row select output from the horizontal shift register 106. Transistor 712 is controlled by a NOT row select output from the horizontal shift register 106. Transistors 716, 722 operate as a second dynamic latch. Transistors 718 and 720 drive transistor 726 in response to control signals T and NOT T which transfer the state of the n offset bit to transistor 726 when activated. The NOT HV reset signal resets the output of transistor 724 while the transfer signals T and NOT T are inactive. After reset the transfer signals active and transistors 718 and 720 drive transistor 726. Transistors 728 and 730 act to drive transistor 710 in response to the output of transistor 726. At the output, a switching transistor 710 controls selection of a compensating resistor by shorting Load tap N to Load tap N+1. The plurality of switches 710A–710D comprise switching transistors 710 in the example above. The first latch may be biased at a first voltage Vdd for operating transistors in the range of 3×2 microns in area, while a second voltage Vda, substantially higher than Vdd, may be selected to operate transistor 710. Transistor 710 may comprise semiconductor material having an area of about 40 by 2 microns.

Having described the elements of the bolometer offset compensator circuitry it will be helpful to the understanding of the invention to now describe the operation of the bolometer offset compensator circuitry. By way of furher background, microbolometer focal plane arrays typically require electronic circuits with a very large dynamic range in order to simultaneously accommodate both detector non-uniformities and very low signal levels. A dynamic range in excess of 1 million to 1 is typical. Electronic circuit switches can meet this difficult requirement, especially when applicable to large focal plane arrays, and provide a significant benefit and a practical application of microbolometer technology. In the embodiment shown in FIG. 15, the nonlinear compensating voltage supply 703, when employed, may be an off-focal plane nonlinear compensating voltage supply connected to on-focal plane circuits comprising the bolometer detectors 218, load resistor 115, pre-amplifier 1704 and compensating resistors 702, 704, and 708. When a voltage, 762, is applied, a current flows through the detector column line 114, load resistor 115 and at least one compensating resistor as selected by opening one or more of the plurality of switches 710A–710D. In some embodiments, load resistor 115 may not be required. A voltage at node V1 is set by a BDI preamplifier 1704 and is nominally the same voltage for each of M detector circuits. The current which flows into the preamplifier 1704 represents the signal current. To compensate for differences in detector resistance where the detector resistance may vary significantly from detector to detector the compensating resistors may be employed. If such compensating resistors are not employed, the preamplifier circuit must have a significantly increased dynamic range in order to accommodate not only the useful signal current, but also significant additional current resulting from detector resistance variations.

As current is applied to the bolometer detectors, $I^2R$ heating raises the temperature of each detector. The increased temperature results in a change in detector resistance, thereby increasing the input dynamic range requirement of the BDI preamplifier 1704. The external nonlinear compensating voltage supply 703 senses the current change at node V1, and provides a nonlinear voltage precisely compensating for $I^2R$ heating induced changes in preamplifier current. In this way, the nonlinear voltage also reduces the dynamic range requirement of the preamplifier 1704 to a level that may be readily achieved in an electronic circuit integrated onto the focal plane.

Figure 17:
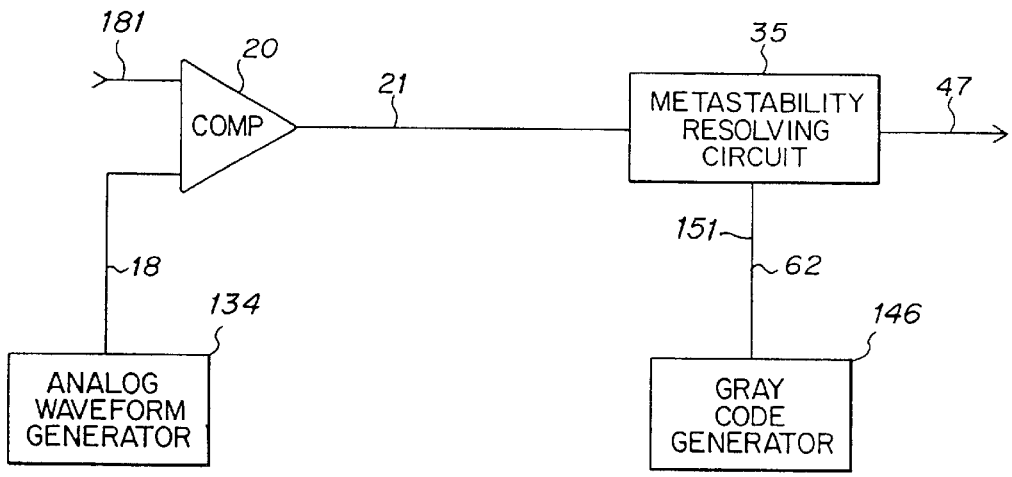
FIG. 17 is a schematic block diagram of an analog-to-digital converter according to the invention.

Reference is now made to FIG. 17 which is an overall schematic block diagram of the analog-to-digital converter of the invention. Analog input signal 181, the analog signal to be converted, is connected to one input of an unclocked analog comparator 20. The other input of the comparator 20 is connected to an analog ramp signal 18. Analog waveform generator 134 generates the analog ramp signal 18. When the analog ramp signal 18 substantially equals the analog input signal 181, the comparator generates output signal 21. The comparator output signal 21 is connected to a control input of a metastability resolving circuit 35. Synchronized with the analog waveform generator 134 is a Gray code generator 146 that generates a digital Gray code 151 on a digital Gray code bus 62. The digital Gray code bus 62 is connected to a data input of the metastability resolving circuit 35. The metastability resolving circuit 35 stores the states of the digital Gray code 151 on bus 62 in response to an active state of the comparator output signal 21. As a result, the digital output signal 47 of the metastability resolving circuit 35 is a digital representation of the magnitude of the analog input signal 181 when the magnitude of the analog ramp signal 18 equals the magnitude of the analog input signal 181.

Figure 18:
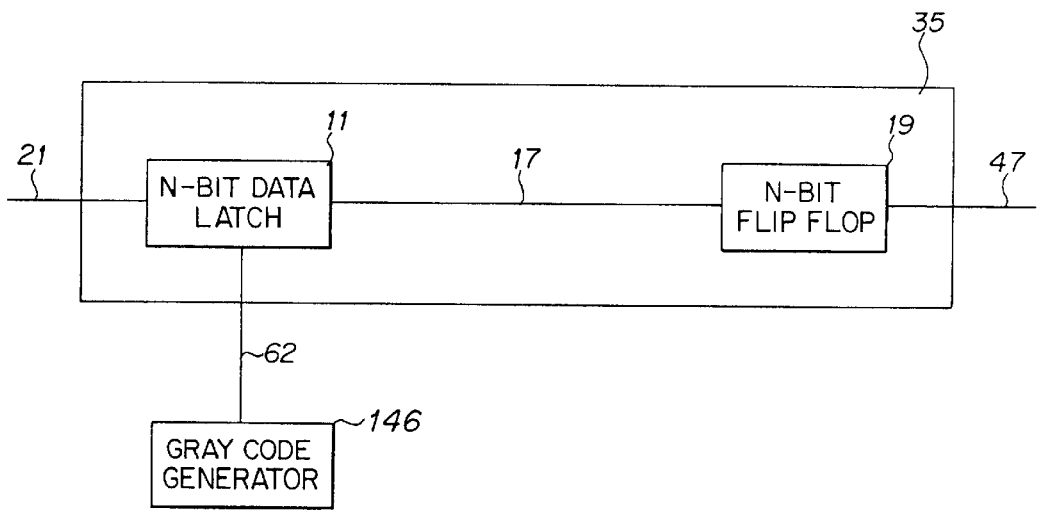
FIG. 18 is a schematic block diagram of the metastability resolving circuit illustrated in FIG. 17.

Reference is now made to FIG. 18, which illustrates the metastability resolving circuit 35 in more detail. Comparator output signal 21 is connected to the control input of an N-Bit data latch 11. N is the number of bits of resolution that the analog signal 181 is digitized (converted) into by the analog-to-digital converter. N can be any number and is typically between eight and sixteen for most applications. The N-bit data latch 11 data input is connected to the digital Gray code bus 62 from the Gray code generator 146. The data latched by the N-bit data latch 11 (which is a code 151 generated by Gray code generator 146) is provided on line 17 to N-bit flip-flop 19. N-bit flip-flop 19 resolves the metastability of the system by storing the data on line 17 a predetermined time period after the N-bit data latch 11 has stored the state of the Gray code generator 146. The digital output 47 is provided as described above.

Figure 18A:
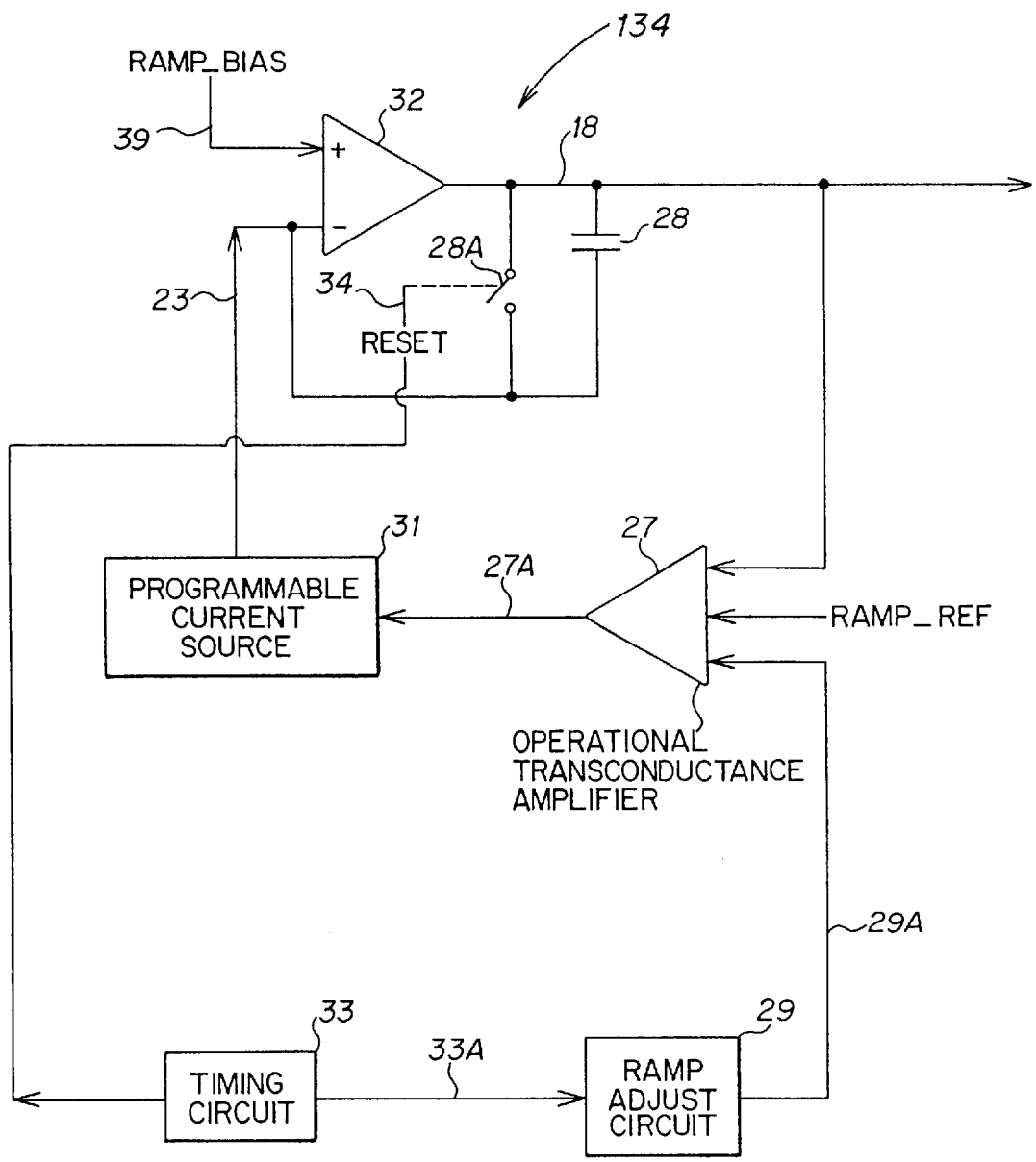
FIG. 18A is a schematic block diagram of the analog waveform generator illustrated in FIG. 17.

Reference is now made to FIG. 18A, which illustrates a schematic block diagram of analog waveform generator 134 illustrated in FIG. 17. Operational amplifier 32 provides the analog ramp signal 18 by providing an output signal to integration capacitor 28. RESET signal 34 is generated by timing circuit 33 and activates switch 28A to discharge capacitor 28 when a new conversion is to be initiated. One input 39 of operational amplifier 32 in connected to a RAMP_BIAS signal and a second input 23 in connected to the output of a programmable current source 31. Programmable current source 31 is controlled by operational transconductance amplifier 27. Amplifier 27 has a first input connected to the analog ramp signal 18. A second input of amplifier 27 is connected to a ramp reference voltage RAMP_REF. A third input of amplifier 27 is connected to the output of ramp adjust circuit 29. The starting voltage of the analog ramp is adjustable by changing the RAMP_BIAS voltage. The slope of the analog ramp signal 18 is controlled by amplifier 27. By changing the output of programmable current source 31 in response to a current signal 27A from transconductance amplifier 27, the slope of the analog ramp signal 18 can be changed. In response to control signal 33A from timing circuit 33, issued just before ramp signal 18 is to terminate, ramp adjust circuit 29, via control signal 29A, turns amplifier 27 on to sample the difference between the RAMP_REF voltage and the voltage of analog ramp signal 18. Transconductance amplifier 27 converts this voltage difference to a current 27A that is used to control programmable current source 31. After programmable current source 31 has been adjusted, timing circuit 33, via control signal 33A, turns amplifier 27 off to open the feedback loop, issues RESET signal 19 to discharge capacitor 28 using switch 28A, and then opens switch 28A to begin another integration cycle.

Figure 19:
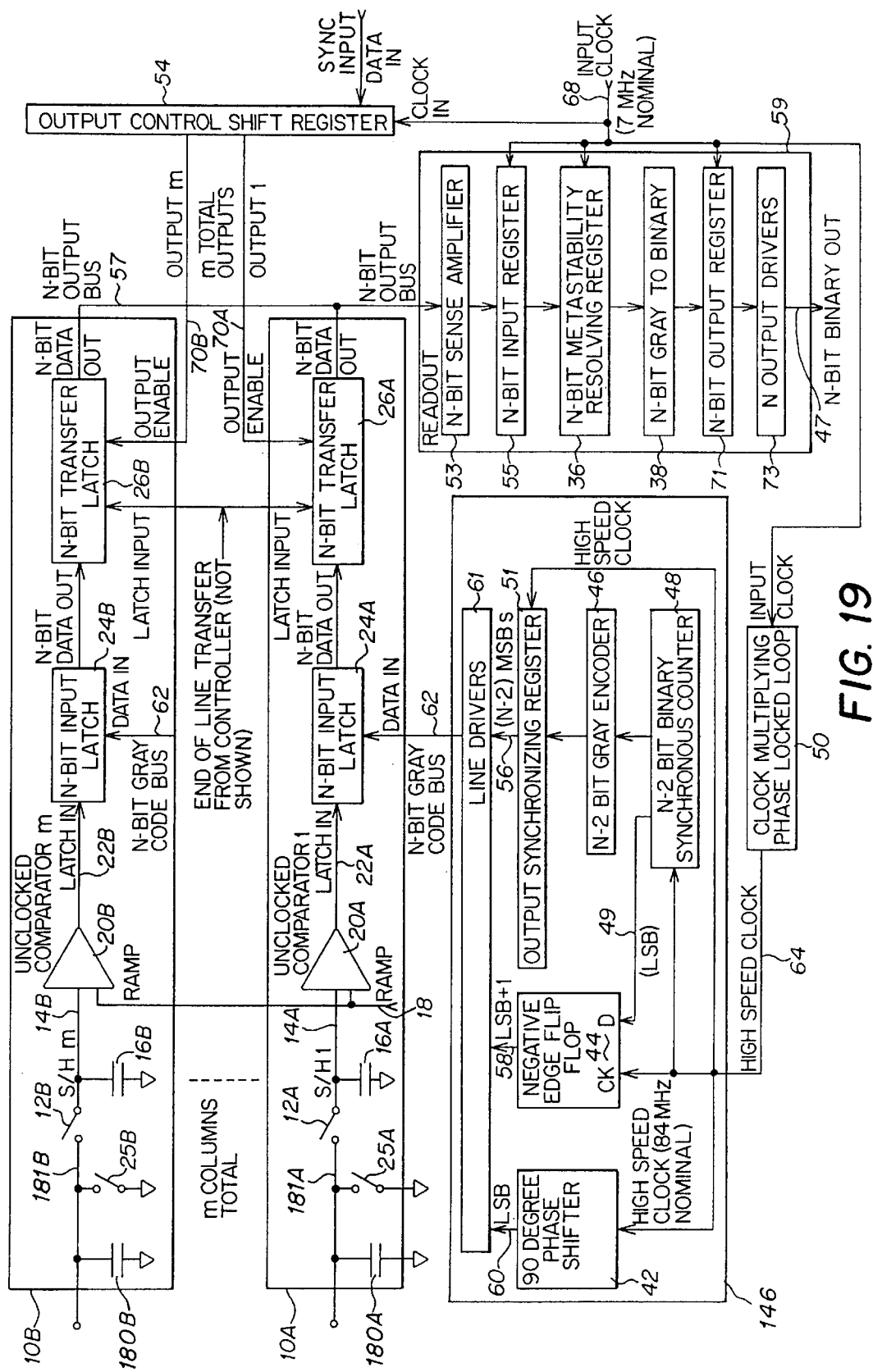
FIG. 19 is a schematic block diagram of an array of analog-to-digital converters according to the invention.

Reference is now made to FIG. 19, which is a schematic block diagram of parallel analog-to-digital converters 10A and 10B. Only two converters are shown for clarity; there could be m number of converters in an array. In one preferred embodiment there are 328 converters in an array. Each analog-to-digital converter is connected to the digital Gray code bus 62 and an output bus 57. The digital Gray code bus 62 is connected to each data input of the m data latches. For clarity, only the connections to data latches 24A and 24B are shown. The data input of each data latch is driven by the gray code generator 146. The N-bit output bus 57 is connected to the data output of each transfer latch (latches 26A and 26B being illustrated) and is read by multiplexer readout circuit 59.

The analog signal on line 181A, the signal to be converted, is stored by capacitor 180A until sampling switch 12A is closed, thereby transferring the charge to capacitor 16A. Capacitor 16A integrates the analog signal 181A until switch 12A is opened. After a predetermined time interval has passed, switch 12A is opened and switch 25A is closed, thus resetting capacitor 180A at the start of each conversion period. Those skilled in the art will recognize that any charge transfer device or circuit may be used to transfer the signal to be compared. During the read out phase the sampled signal 14A is compared to an analog ramp signal 18 by comparator 20A. When the sampled signal 14A is equal to or at some predetermined potential with respect to the analog ramp signal 18, the output 22A of the comparator 20A activates latch 24A. The output of the comparator 20A is connected to the enable input of latch 24A. The latch 24A, connected to digital Gray code bus 62, stores the state of the gray code count at the time the analog ramp signal 18 equals the sampled signal 14A in response to comparator output signal 22A. The output of latch 24A is provided to a transfer latch 26A. Output control shift register 54, connected to transfer latches 26A and 26B, selects the output of a particular analog-to-digital converter from the array of converters. The output of each transfer latch is connected to sense amplifier 53 via N-bit output bus 57, part of multiplexer readout circuit 59. Only one transfer latch is active and supplying an output to bus 57 at any one time. The output control register 54 is synchronized with input clock 68.

Multiplexer readout circuit 59 will now be described. One skilled in the art will appreciate that each of the circuit blocks in multiplexer readout circuit 59 is N-bits wide to accommodate the number of bits from each transfer latch. The output of sense amplifier 53 is connected to the input of input register 55 which is clocked by input clock 68. Input register 55 latches the data on N-bit output bus 57 from whichever N-bit transfer latch has been enabled by output control shift register 54. The output of register 55 is connected to the input of a metastability resolving register 36 that is also clocked by input clock 68. Metastability resolving register 36 is clocked so that one full clock cycle after the state of N-bit output bus 57 has been latched into input register 55, the data from input register 55 is provided to the input of metastability resolving register 36. Register 36 resolves the metastability of the conversion that may have arisen when the digital signal on bus 62 was latched by output signal 22A from analog comparator 20A. Circuit analysis of this latch train arrangement has indicated that the metastability of the system is improved by a factor of at least $2^{30}$ by the addition of metastability resolving register 36. The output of the metastability resolving register 36 is connected to a Gray code decoder 38 that converts the Gray code signal to a standard binary signal. The Gray code decoder 38 may use an exclusive-ORing (XORing) process in which the output of each latch in the metastability resolving register 36 is exclusive-ORed (XORed) with an adjacent bit that has in turn been exclusive-ORed with another bit, and so on. The standard binary N-bit code output by Gray code decoder 38 is provided to the data input of N-bit output register 71, which latches the output value in response to input clock 68. The output of output register 71 is provided to N output drivers 73 that provide the N-bit converted binary output signal 47.

Input clock 68 is also provided to a clock multiplying phase locked loop circuit 50 that generates a high speed clock 64. In one embodiment of the invention, the clock multiplier is a 12×clock multiplier. In one embodiment of the invention, for example, input clock 68 is a 7 MHZ nominal clock and clock multiplier 50 increases this by a factor of 12 to 84 MHZ.

Gray code generator 146 will now be described. The digital Gray code 151 on bus 62, which in one embodiment of the invention is an N-bit binary gray code, is generated by concatenation of three bit streams: a least significant bit 60, a next-to-least significant bit 58 and a N−2 bit gray code word 56. The high speed clock 64 clocks an N−2 bit synchronous binary counter 48. The N−2 bit synchronous counter 48 provides an output signal to an N−2 bit Gray code encoder 46. The Gray code encoder provides the N−2 most significant bits 56 of the digital Gray code on bus 62. Gray code encoder 46 provides a Gray code by XORing each bit output by counter 48 with an adjacent output bit.

The high speed clock 64 and the N−2 bit synchronous counter's least significant bit 49 is connected to a negative edge triggered flip-flop 44. The negative edge triggered flip-flop 44 provides the next to least significant bit signal, LSB+1 58, as part of the digital Gray code on bus 62.

The high speed clock 64 is also connected to a 90° analog phase shifter 42. The 90° phase shifter 42 generates the least significant bit signal, LSB 60, as part of the digital Gray code on bus 62 by shifting the high speed clock 64 by 90°.

In one example embodiment, N is equal to 13 bits, synchronous counter 48 and Gray code encoder 46 provide the 11 most significant bits on Gray code bus 62. A 12th bit (LSB+1) is supplied by dividing a 75 (approximately) MHZ clock by two and then latching it with the falling edge of the 75 MHZ clock in flip-flop 44. The 13th bit (LSB) is generated by delaying the 75 MHZ clock by precisely 90°, ¼ of a complete clock cycle, in closed loop phase shifter 42. This type of phase shifter is sometimes referred to as a delay locked loop.

Figure 20:
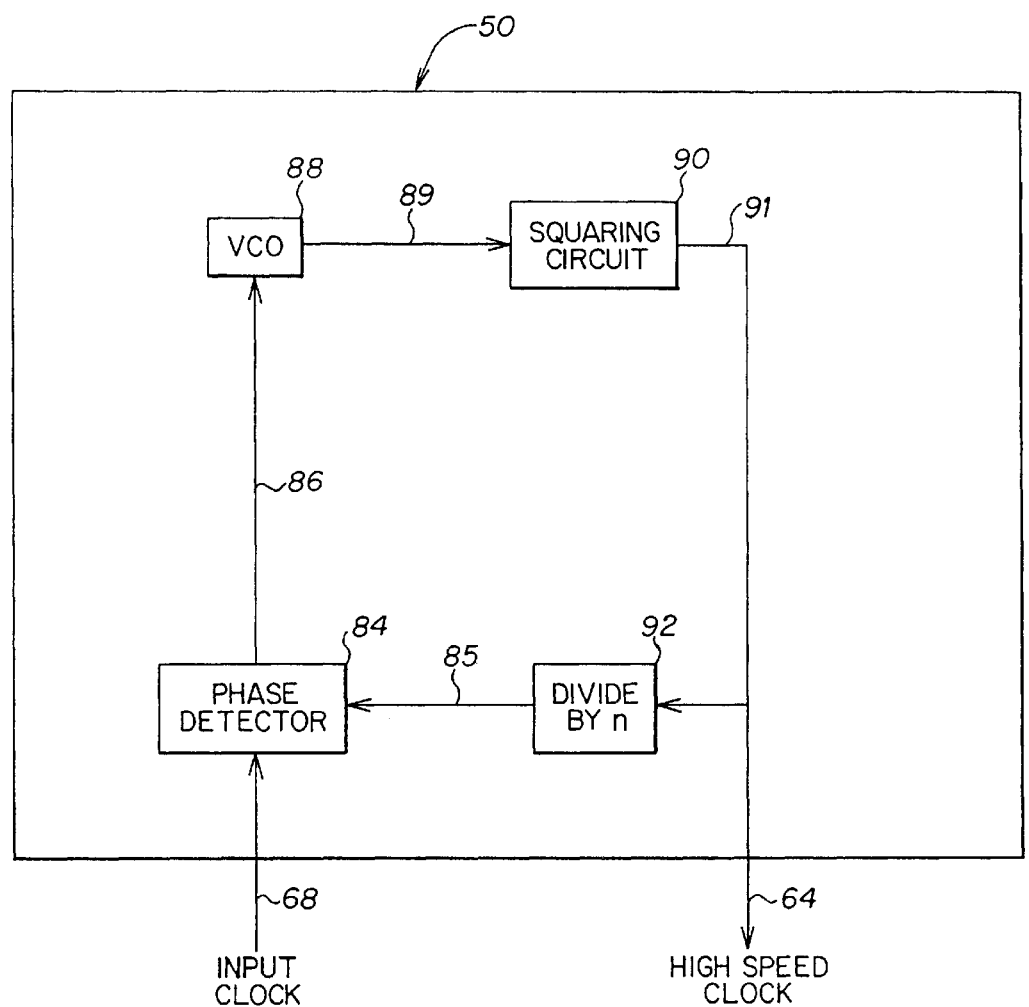
FIG. 20 is a schematic block diagram of the clock multiplying phase locked loop illustrated in FIG. 19.

Reference is now made to FIG. 20, which illustrates in more detail, the clock multiplying phase locked loop 50 of FIG. 19. Clock multiplier 50 includes a phase detector 84 that detects a difference in phase between input clock 68 and a frequency divided version of high speed clock 64 on line 85. The output 86 of phase detector 100 is used to control a frequency multiplying voltage controlled oscillator (VCO) 88. VCO 88 increases the frequency of input clock 68 by a predetermined factor. In one example, VCO 88 increases the frequency of input clock 68 by a factor of 12 to produce high speed clock 64. The output 89 of VCO 106 is provided to a "squaring" circuit 90. The function of squaring circuit 90 is to shape the output signal 91 so that high speed clock 64 has a fifty percent duty cycle, i.e., a "square" output. High speed clock 64 is also provided to a divide by n circuit 92 that divides the frequency by a factor n so that the frequency of the clock signal delivered on line 85 is equal to the frequency of input clock 68. As discussed before, in one embodiment, if VCO 88 increases the clock frequency by a factor of 12, then n would be 12 so that divide by n circuit 92 reduces the frequency of high speed clock 64 by a factor of 12 before providing that signal to phase detector 84. In one embodiment, VCO 88 may include a ring oscillator.

Figure 21:
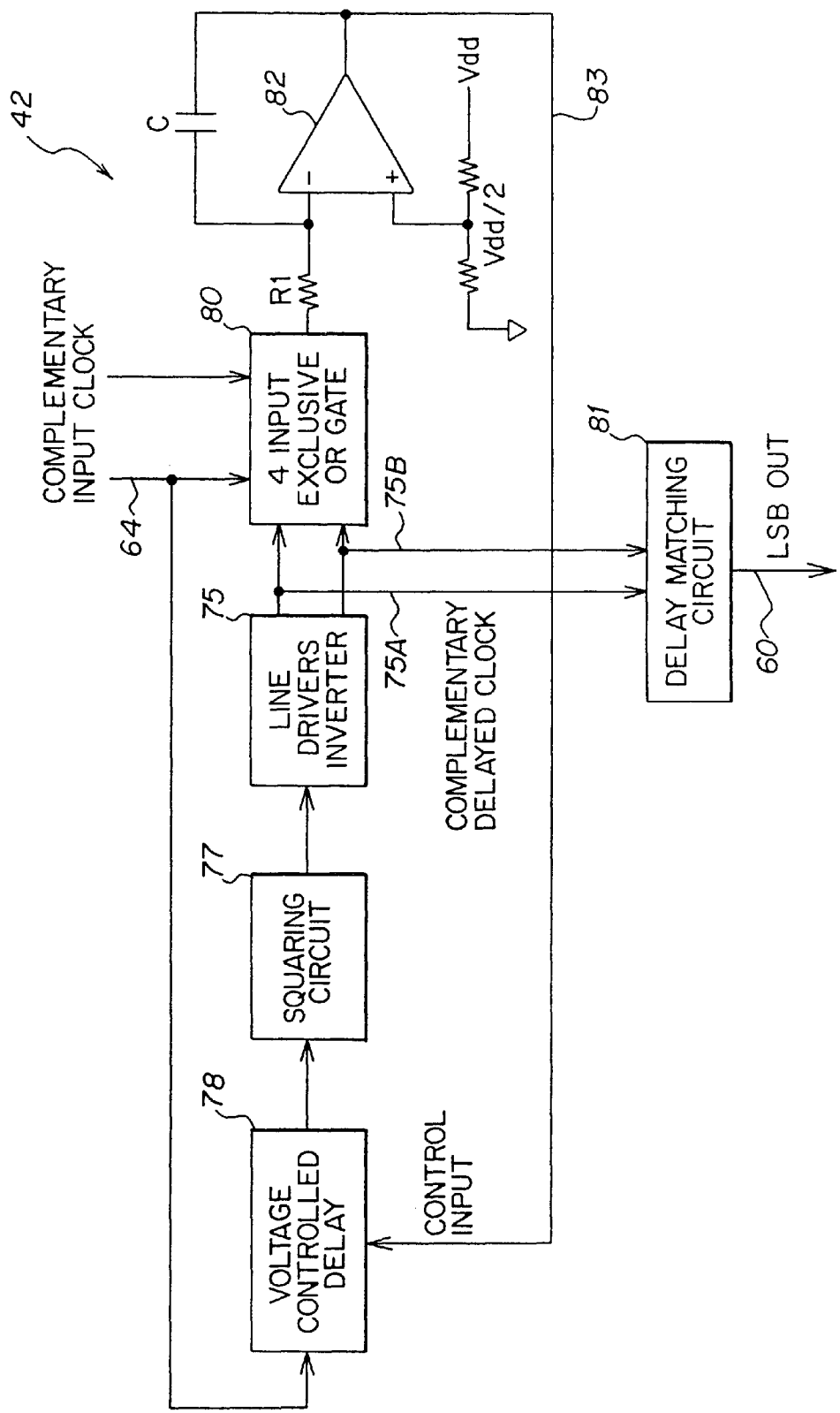
FIG. 21 is a schematic block diagram of the 90° phase shifter illustrated in FIG. 19.

Reference is now made to FIG. 21, which FIG. is a schematic block diagram of the 90° analog phase shifter 42 illustrated in FIG. 19. High speed clock 64 and its complement from clock multiplier 50 are connected to the first and second clocking inputs of a four input exclusive or (XOR) gate 80. XOR gate 80 includes an output coupled to the inverting input of a high gain integrating amplifier 82. Amplifier 82 outputs a control signal 83 which is coupled to a control input of a voltage controlled delay circuit 78. The voltage controlled delay circuit 78 also receives a clocking signal from the high speed clock 64. The high gain of amplifier 82 ensures that the delay is always 90° even in the presence of variations in component values and clock frequency. The voltage controlled delay circuit 78 outputs a delayed signal in response to the control signal 83 and clock 64 to a "squaring" circuit 77. Squaring circuit 77 shapes the delayed signal so that it is symmetrical and has a fifty percent duty cycle (i.e., a "square" output) and outputs a signal to the input of line driver invertor 75. Squaring circuit 77 is similar to squaring circuit 90, previously described. Line driver invertor 75 outputs a first line driver invertor signal 75A and a second line driver invertor signal 75B to third and fourth inputs of the four input exclusive OR gate 80. The first and second line driver invertor signals are also coupled to first and second inputs of a delay matching circuit 81. Signals 75A and 75B comprise a complementary delayed clock. Delay matching circuit 81 ensures that the delay experienced by each signal 75A and 75B is the same, so that the signals remain in the proper phase relationship with each other. The delay matching circuit 81 outputs LSB 60.

Figure 22:
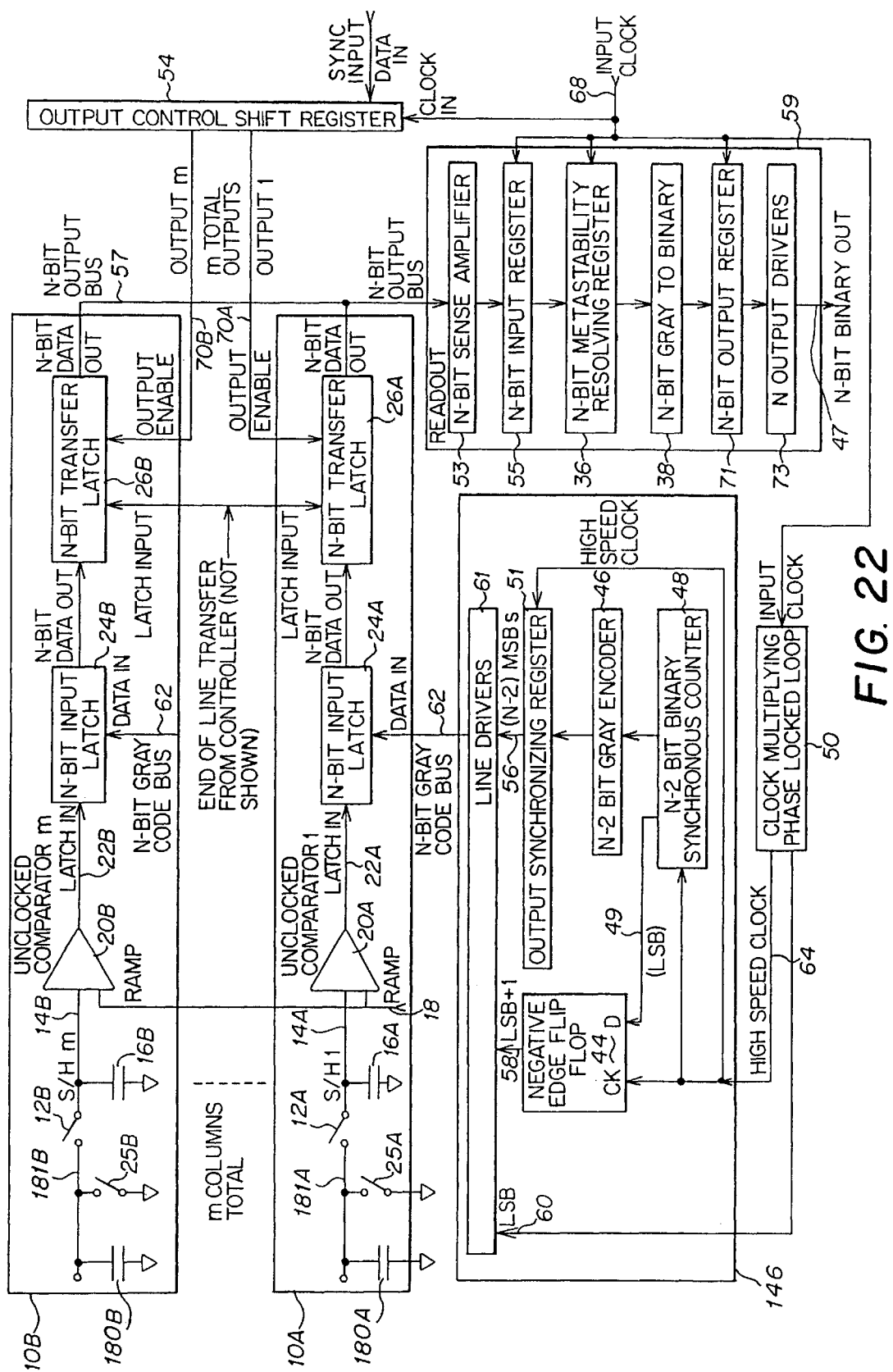
FIG. 22 is a schematic block diagram of an alternate embodiment of the circuit illustrated in FIG. 19.

Reference is now made to FIG. 22, which is a schematic block diagram of an alternate embodiment of the circuit of FIG. 19. In the circuit of FIG. 6, the 90° phase shifter 42 of FIG. 3 has been eliminated. In addition, clock multiplier 50 has been modified so as to provide LSB 60 directly. In all other respects, the operation of FIG. 6 is the same as already described in connection with FIG. 3.

Figure 23:
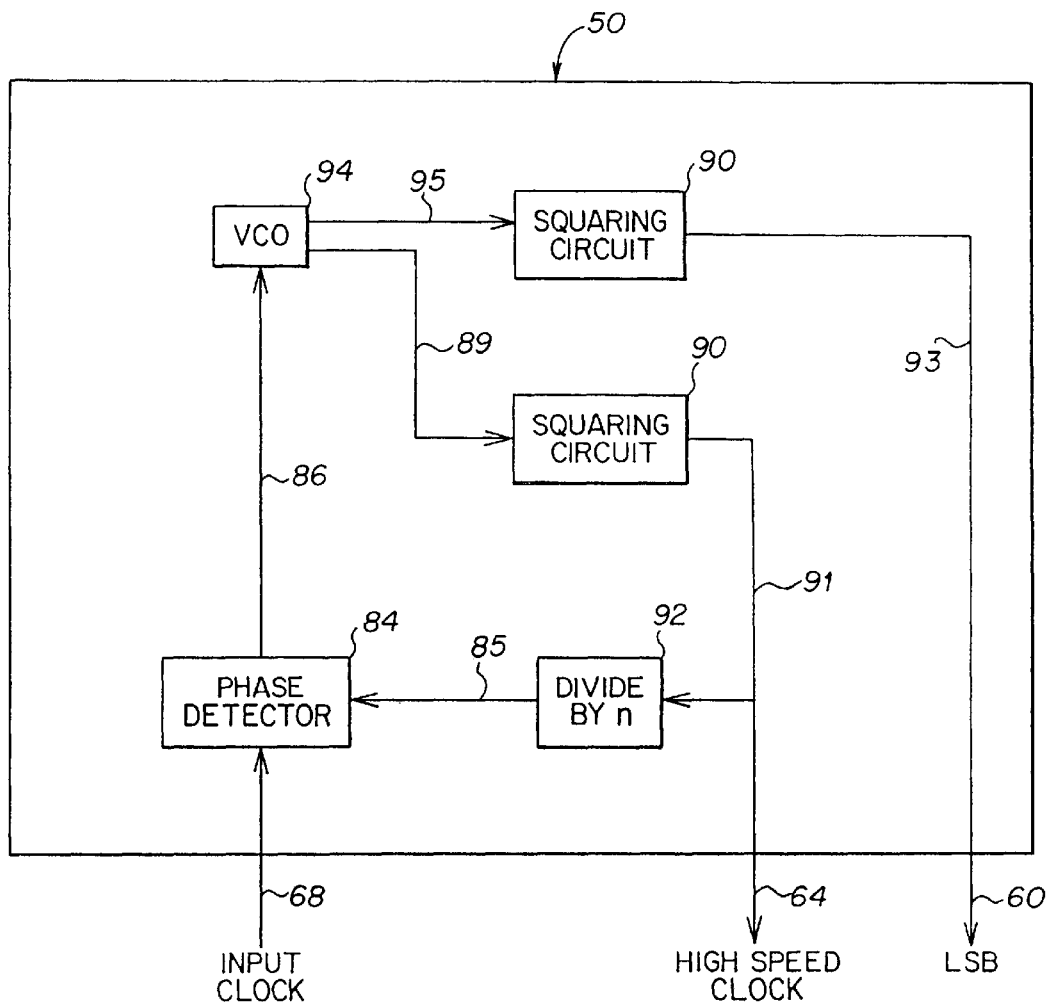
FIG. 23 is a schematic block diagram of a two phase voltage controlled oscillator and squaring circuit used in the circuit of FIG. 22.

Reference is now made to FIG. 23, which FIG. is a schematic block diagram of the clock multiplier 50 of FIG. 6. In FIG. 23, as in FIG. 20, input clock 68 is provided to a phase detector 84 that provides a control signal 86, in response to input clock 68 and signal 85, to a voltage controlled oscillator 94. VCO 94 also multiplies the output frequency provided on line 89 to squaring circuit 90 in order to generate high speed clock 64 on line 91. The output of squaring circuit 90 on line 91 is additionally provided to divide by n circuit 92 that delivers control signal 85 in the same manner as described in connection with FIG. 4.

VCO 94 also provides a second output 95 that is phase shifted 90° with respect to output 89 and then provided to another squaring circuit 90. Squaring circuit 90 operates in the manner described in connection with FIG. 4 to provide a "square" output for the LSB 60 on line 93.

Figure 24:
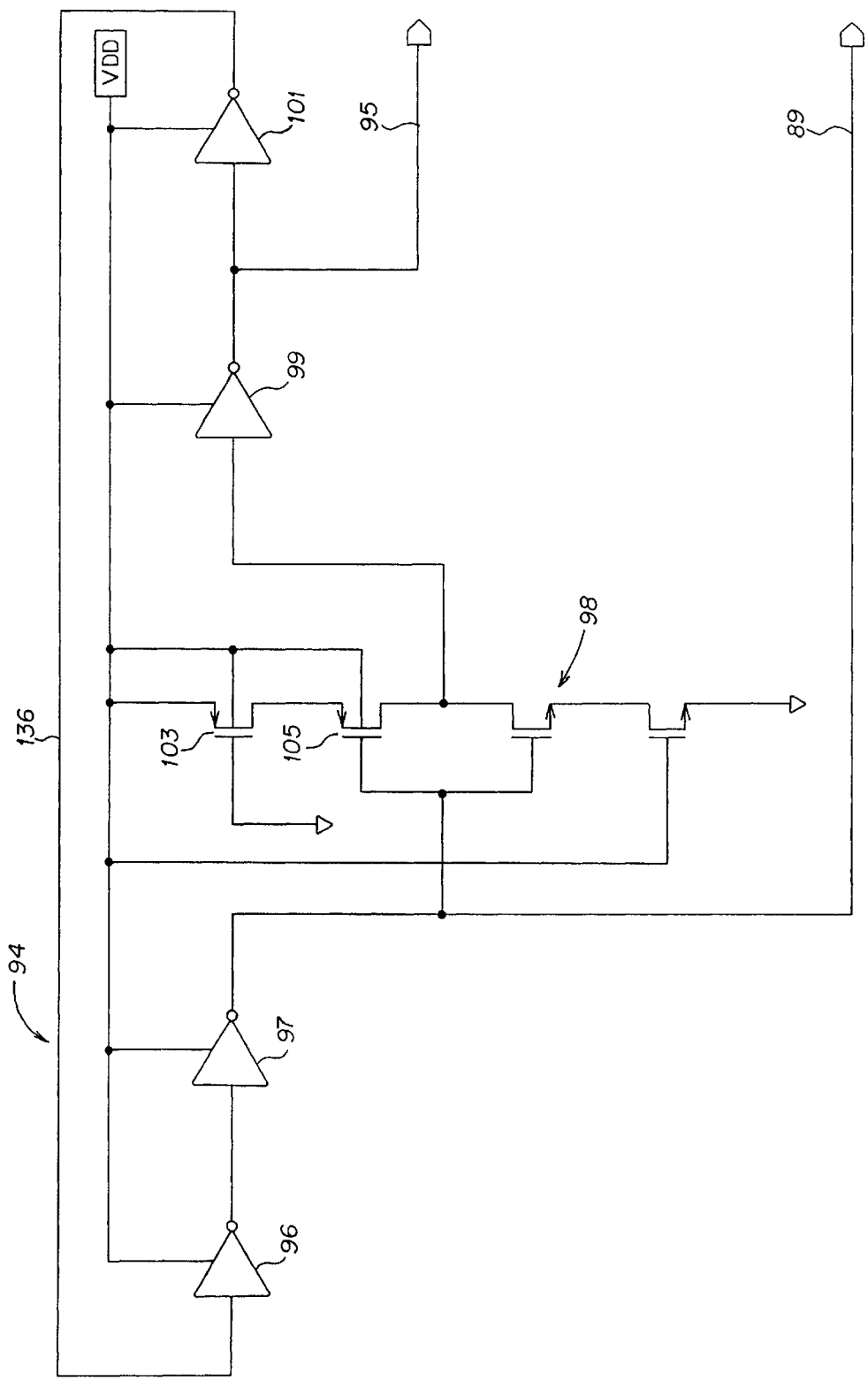
FIG. 24 is a detailed schematic circuit diagram of the voltage controlled oscillator illustrated in FIG. 23.

Reference is now made to FIG. 24, which FIG. is a schematic diagram of VCO 94. VCO 94 provides two outputs 89, 95 that are 90° out of phase from each other. VCO 94 is a ring oscillator formed from an odd number of invertor stages connected in a loop. In particular, VCO 94 includes invertors 96, 97, 98, 99, and 101. The output of invertor 101 is connected via line 136 to the input of inverter 96 in order to form the ring. If t is the time delay of one of the invertors and p is the number of stages in the oscillator, then the oscillation frequency f is:

$$f=1/(2pt) \quad (1)$$

Changing the frequency is accomplished by changing the power supply voltage of the invertor chain, thus changing time t. In the case of the CMOS invertor, the propagation delay increases as the supply voltage is decreased.

The phase shift per stage in the ring oscillator is:

$$\text{Phase/stage}=180/p \quad (2)$$

For example, in the five stage oscillator illustrated in FIG. 24, the phase shift per stage is 36°. Thus, a tap two stages away from the main output will have a 72° phase shift, while a tap three stages away from the main output will have a 108° phase shift. If all of the invertors are identical, then a 90° phase shift is not possible.

However, if the different invertors in the ring oscillator are not identically constructed, then a 90° phase shift between invertors in the ring oscillator can be obtained. In a CMOS invertor, the delay through the invertor depends upon a number of factors, including the size and shape of the component transistors and the amount of capacitive loading on its output. Adjusting any of these factors to increase the propagation delay of one of the invertors with respect to the remaining invertors in the ring can be used to provide the required 90° phase shift.

In VCO 94 illustrated in FIG. 24, the propagation delay of invertor 98 is adjusted by adding two transistors 103 and 105 that are biased so as to always be in the on state. This increases the propagation delay through invertor 98 so that the total delay through invertors 101, 96, and 97 is about the same as the delay through modified invertor 98 and invertor 99. If the delay through invertors 101, 96, and 97 is the same as the delay through modified invertor 98 and invertor 99, then there is exactly a 90° phase shift between outputs 89 and 95.

Figure 25:
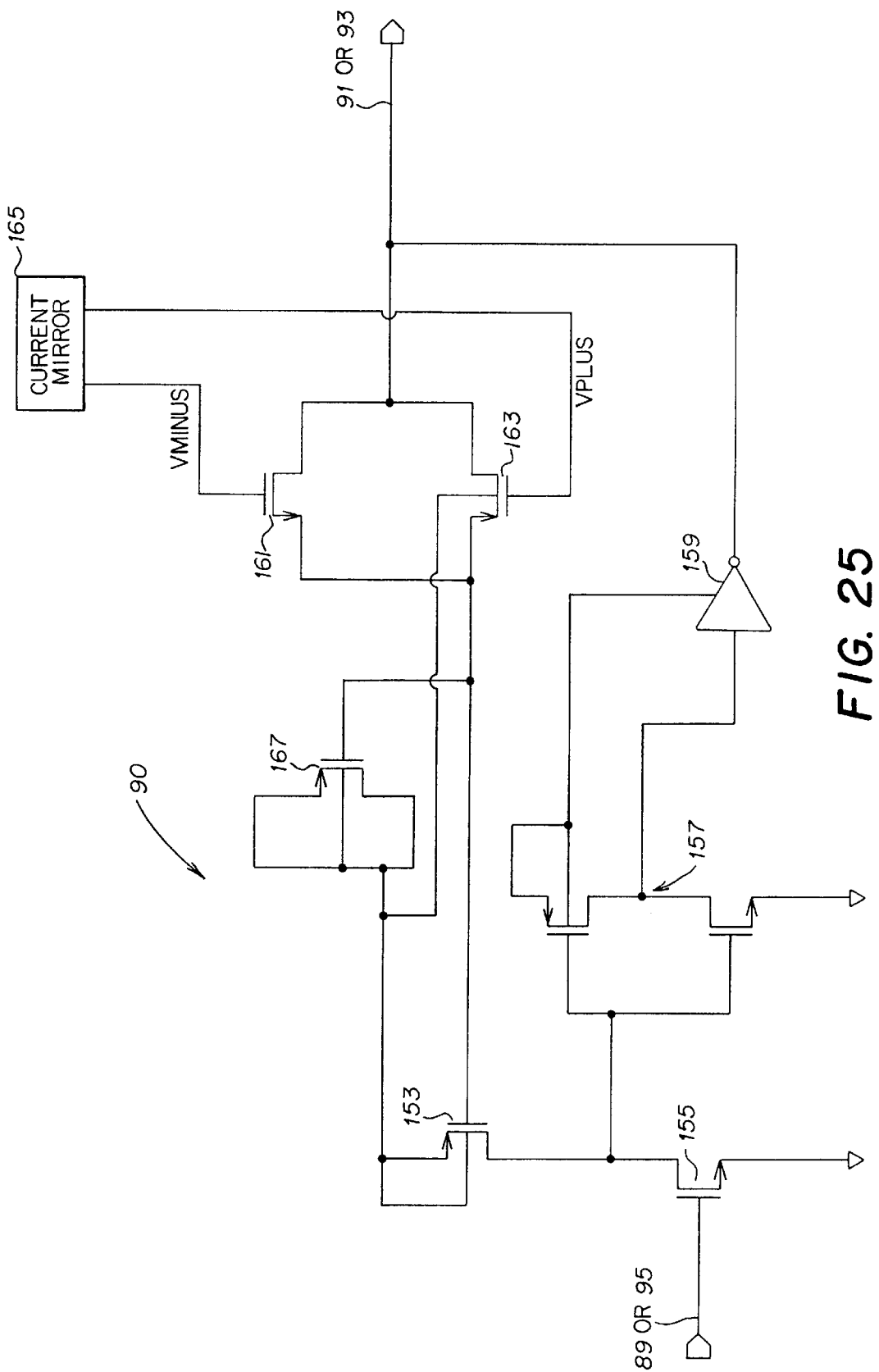
FIG. 25 is a detailed schematic circuit diagram of the squaring circuit illustrated in FIG. 23.

Reference is now made to FIG. 25, which FIG. is a schematic circuit diagram of squaring circuit 90 illustrated in FIGS. 20 and 23. Squaring circuit 77 is FIG. 5 also operates in the same manner as squaring circuit 90.

As illustrated in FIG. 25, the output of VCO 94 is provided to squaring circuit 90. Obviously, in the case of the circuit illustrated in FIG. 23, two squaring circuits are provided, one for each output of VCO 94.

Typically, VCO 94 operates at a reduced voltage compared to the rest of the circuitry, and therefore outputs 89 and 95 need to be translated to the higher voltage level of the rest of the circuits. In addition, the propagation delay generally will not be the same for the rising and falling edges of the output signal and therefore the output of the level translator circuit will not be symmetrical, i.e., have a "square" output or fifty percent duty cycle, even though the signals internal to the ring oscillator are symmetric. Circuit 90 thus incorporates the level translator into a closed loop feedback circuit that adjusts the input threshold as needed to maintain the symmetry of the output signal.

The level shifter includes transistors 153 and 155, and invertors 157 and 159. Two current source transistors 161 and 163 are controlled by voltages VMINUS and VPLUS. The voltages VMINUS and VPLUS are supplied by current mirror 165 and control the amount of current delivered by the transistors 161 and 163. A feedback loop of signal 91 or 93 is provided through transistors 161, 163, transistor 167, to level shifting transistors 153 and 155. If the waveform of output signal 91 or 93 becomes asymmetrical, i.e., not "square", transistors 161, 163 respond by changing the gate voltage on the input stage current source transistor 153 in a direction that reestablishes symmetry of the output. Additionally, transistor 167, used as a capacitor, filters out any ripple voltage and sets the response time of the feedback loop.

Figure 26:
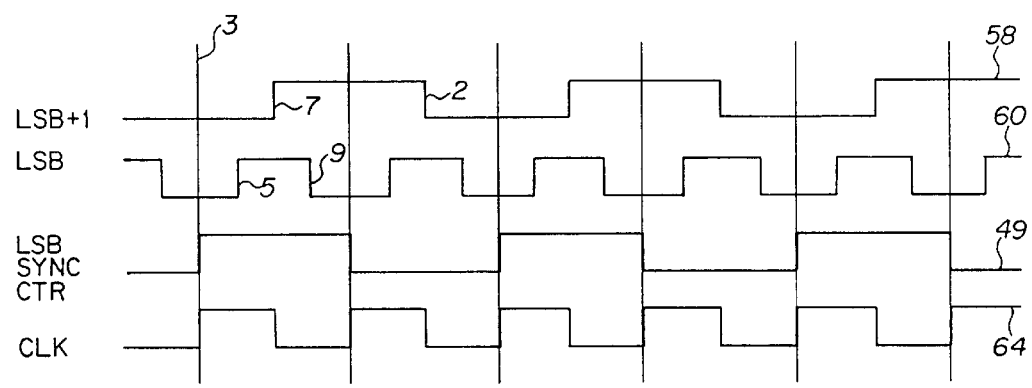
FIG. 26 is a timing diagram illustrating the temporal relationship among the least significant bits of the Gray code signal.

Reference is now made to FIG. 26, which is a timing diagram of the LSB 60 and LSB+1 58. The timing diagram of FIG. 26 illustrates the operation of either the circuit of FIG. 19 or the circuit of FIG. 22. The high speed clock 64 transitions from low to high at time 3. The least significant bit 49 of the N−2 bit binary counter 48 transitions on the low to high transition of the high speed clock 64. The LSB 60, derived from the high speed clock 64, transitions high at time 5 and low at time 9. The LSB+1 58, derived from the counter least significant bit 4, transitions high at time 7 and low at time 2. The N−2 most significant bits 56 of the Gray encoded signal transition only at time 3 while the LSB 60 and LSB+1 58 signals do not change at time 3. At times 2, 5, 7, and 9 only one of these signals changes at a time, thus meeting the Gray code requirement of having only a single bit change when there is a change in the count.

One skilled in the art will appreciate that rather than using an input clock having a frequency that is multiplied in order to provide a high speed clock, an external high speed clock could be used to control counter 48, flip-flop 44, and 90° phase shifter 42.

One advantage of the present invention is that the Gray code least significant bit frequency may be equal to the frequency of the clock that is used to control the circuit. This means that the least significant bit frequency may be equal to the maximum toggle frequency for the flip-flop. Conventionally, for a typical Gray code, the master clock frequency is four times the frequency of the least significant bit of the Gray code. In the present invention, by contrast, the frequency of the least significant bit of the Gray code can be equal to the clock frequency. Therefore, the clock frequency is only limited by the inherent frequency limitations of the clock counter circuitry itself. This allows for higher conversion rates then conventionally achievable.

For a typical 2 micron CMOS process at room temperature, this frequency limit is about 150 MHZ, and about 500 MHZ at 80° K. For a typical 1 micron CMOS process, this frequency limit is about 500 MHZ at room temperature, and may be more than 1 Ghz at 80° K. In one embodiment of the invention, a 72 MHZ master clock generates a Gray code with 3.5 ns resolution which allows a 13 bit conversion in 30 μs. A 500 MHZ master clock generates a Gray code with 500 ps resolution, allowing a 16 bit conversion in 33 μs or 12 bits in 2 μs. With several hundred of these converters on one chip, the total conversion rate may be on the order of 100 MHZ. The estimated power is less than 50 μw per channel. As a result, the present invention allows the relatively slow single slope method of analog-to-digital conversion, when a array of such converters are used on a single chip, to provide relatively high conversion rates, while consuming low amounts of power. Furthermore, the simple design of single slope analog-to-digital converters saves power and allows integration of a large number of these converters on a single integrated circuit, particularly when using CMOS technology.

A Gray code count is used as the digital signal to be stored when the comparator is activated because, by definition, only one bit changes for each increment of the code. Since only one of the Gray coded bits can be in the process of changing when the latch is enabled, only one of the sampled bits can exhibit metastability, and the resultant code will be uncertain by only one least significant bit. This is in contrast to the case when a standard binary code is used as the digital signal to be stored. Since more than one bit may be changing for each increment of the code, a number of the sampled bits can exhibit metastability.

The use of a Gray code count also advantageously allows the metastability resolution to be determined at a point in the circuit where there is more time to complete it, thus reducing the power and speed requirements of the circuitry. As a result, in the present invention, the metastability resolution can be postponed until after the multiplexing of the data when the data rate is considerably lower than the rate at which the data is provided by each analog-to-digital converter. In particular, in conventional circuits, the metastability resolution might typically be provided when the binary code from a counter is clocked into the N-bit data latches. This might require the metastability resolution to be performed in a very short time interval at a relatively high clock rate. As noted. by contrast, the present invention can accomplish this function using a significantly lower clock rate, which reduces the power and speed requirements of the circuitry.

For example, a 75 MHZ (approximately) clock may be used to generate the Gray code. This 75 MHZ clock is generated from a 6 MHZ (approximately) input clock. The 75 MHZ clock is used only for the analog-to-digital conversion; the 6 MHZ clock is used for all other functions of the integrated circuit.

By using an array of 328 converters, a conversion is completed in approximately 30 microseconds with a resolution of 13 bits. A conventional approach requires a master clock frequency of approximately 300 MHZ, which is higher than the capability of, for example, a conventional 2 micron CMOS process. The use of a gray code allows the metastability resolution to be performed at a rate of 6 MHZ on 13 bits rather than 300 MHZ on 328 comparators.

The invention also provides a method of converting the analog signals from an array of analog-to-digital converters with a high effective clock rate, and increased resolution. A multitude of input signals, one for each converter, are sampled and held. Signals are formed by integrated the current from an analog source. This signal is held constant on a capacitor for the duration of the conversion process. Next, an analog ramp and a digital counter are simultaneously started. A comparator circuit compares the voltage of the ramp with the sampled and held voltage. When the two are equal, the output of the comparator changes state and causes the value of the digital counter to be stored in an N bit latch. The values stored in the array of latches, which are a digital representation of the various input voltages. are transferred in parallel to another array of latches. Then a new set of conversions can be performed while the results of the previous conversions are multiplexed to form a digital output signal.

For an array of converters, the digital counter and ramp generator are common to all converters. Each converter itself needs only a sample and hold, a comparator, and an array of digital latches.

The circuits of the present invention may be monolithically integrated in semiconductor form using convention CMOS technology.

Having thus described at least one illustrative embodiment of the invention. various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Apparatus comprising:
at least one sensor to detect radiation and to output image signals based on the detected radiation; and
offset correction circuitry to compensate errors in the image signals and to output corrected image signals,
wherein the sensor and at least a portion of the offset correction circuitry are monolithically integrated on a single semiconductor substrate, and
wherein the offset correction circuitry further includes means for providing a time-varying compensation signal for each at least one sensor to compensate the errors in the image signals.

2. The apparatus of claim 1, wherein the at least one sensor includes a plurality of microbolometer elements.

3. The apparatus of claims 1, further including an analog to digital converter to output digital image data based on the corrected image signals.

4. The apparatus of claim 1, wherein the means for providing a time-varying compensation signal includes means for providing a different time-varying compensation signal for each sensor.

5. The apparatus of claim 1, wherein the means for providing the time-varying compensation includes means for receiving digital data.

6. The apparatus of claim 1, wherein the means for providing a time-varying compensation signal include a nonlinear compensating voltage supply to compensate changes in the image signals due to current-induced heating of the at least one sensor.

7. The apparatus of claim 1, wherein the offset correction circuitry includes means for receiving digital offset data.

8. The apparatus of claim 7, wherein:
the at least one sensor includes a plurality of sensors; and
the offset correction circuitry includes a digital to analog converter to compensate non-uniformities of the sensors.

9. The apparatus of claim 8, wherein:
the plurality of sensors includes a plurality of microbolometer elements; and
the digital to analog converter compensates resistance non-uniformities of the microbolometer elements.

10. The apparatus of claim 8, wherein the digital to analog converter includes:
a plurality of compensating resistors connected in series; and
a corresponding plurality of compensating resistor switches, each compensating resistor switch connected across a respective compensating resistor and responsive to the digital offset data, to selectively short the respective compensating resistor based on the digital offset data.

11. The apparatus of claim 8, further including an analog to digital converter to output digital image data based on the corrected image signals.

12. The apparatus of claim 7, wherein the means for receiving digital offset data includes a digital to analog converter.

13. Apparatus comprising:
at least one sensor to detect radiation and to output image signals based on the detected radiation; and
offset correction circuitry to compensate errors in the image signals and to output corrected image signals,
wherein the sensor and at least a portion of the offset correction circuitry are monolithically integrated on a single semiconductor substrate,
wherein the offset correction circuitry includes means for receiving digital offset data, wherein:
the at least one sensor includes a plurality of sensors; and
the offset correction circuitry includes a digital to analog converter to compensate non-uniformities of the sensors, and
wherein the offset correction circuitry further includes a nonlinear compensating voltage supply to compensate changes in the image signals due to current-induced heating of the at least one sensor.

14. The apparatus of claim 13, wherein the offset correction circuitry further includes an analog to digital converter to output digital image data based on the corrected image signals.

15. Apparatus comprising:
at least one sensor to detect radiation and to output image signals based on the detected radiation; and
offset correction circuitry to compensate errors in the image signals and to output corrected image signals,
wherein the sensor and at least a portion of the offset correction circuitry are monolithically integrated on a single semiconductor substrate,
wherein the offset correction circuitry includes means for receiving digital offset data,
wherein the means for receiving digital offset data includes a digital to analog converter, and
wherein the offset correction circuitry further includes:
an amplifier to receive the image signals and to output amplified image signals; and
an offset capacitor, coupled to an output of the amplifier and responsive to an analog signal output from the digital to analog converter, to add an offset signal to the amplified image signals so as to provide the corrected image signals.

16. The apparatus of claim 15, wherein the offset signal is a time-varying compensation signal based on a charging and a discharging of the offset capacitor.

17. The apparatus of claim 15, wherein the offset correction circuitry further includes:
an integration capacitor to receive the corrected image signals and to provide integrated corrected image signals; and
means for discharging the integration capacitor when the integrated corrected image signals exceed a predetermined threshold.

18. The apparatus of claim 17, wherein the offset correction circuitry further includes:
an overflow counter to output digital overflow data based on a number of times the means for discharging the integration capacitor discharges the integration capacitor; and
an analog to digital converter to convert the integrated corrected image signals to digital image data.

19. The apparatus of claim 18, wherein the offset correction circuitry further includes an output driver to concatenate the digital overflow data and the digital image data so as to provide a digital data output.

* * * * *